United States Patent
Wang et al.

(10) Patent No.: US 12,388,583 B2
(45) Date of Patent: Aug. 12, 2025

(54) COMMUNICATION METHOD AND APPARATUS

(71) Applicant: HUAWEI TECHNOLOGIES CO., LTD., Shenzhen (CN)

(72) Inventors: Fan Wang, Shanghai (CN); Mengying Ding, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 509 days.

(21) Appl. No.: 17/833,186

(22) Filed: Jun. 6, 2022

(65) Prior Publication Data
US 2022/0303074 A1    Sep. 22, 2022

Related U.S. Application Data

(63) Continuation of application No. PCT/CN2019/123577, filed on Dec. 6, 2019.

(51) Int. Cl.
*H04L 5/00*    (2006.01)
*H04J 13/00*    (2011.01)
(Continued)

(52) U.S. Cl.
CPC ........ *H04L 5/0012* (2013.01); *H04J 13/0029* (2013.01); *H04L 5/0023* (2013.01);
(Continued)

(58) Field of Classification Search
CPC .. H04L 5/0012; H04L 5/0023; H04J 13/0029; H04J 13/0003; H04W 72/0446;
(Continued)

(56) References Cited

U.S. PATENT DOCUMENTS

2006/0209754 A1*   9/2006   Ji ........................... H04J 11/005
                                                                   370/329
2009/0279587 A1   11/2009   Eriksson et al.
(Continued)

FOREIGN PATENT DOCUMENTS

CN        103095336 A        5/2013
CN        109997312 A        7/2019
(Continued)

OTHER PUBLICATIONS

Extended European Search Report issued in corresponding European Application No. 19955103.7, dated Oct. 10, 2022, pp. 1-9.
(Continued)

*Primary Examiner* — Edan Orgad
*Assistant Examiner* — Samuel Dilan Rutnam
(74) *Attorney, Agent, or Firm* — HAUPTMAN HAM, LLP

(57) ABSTRACT

A communication method includes receiving first data from a network device or a terminal device, and demapping the first data based on a first frequency hopping pattern. The first frequency hopping pattern is one of K candidate frequency hopping patterns. One candidate frequency hopping pattern in the K candidate frequency hopping patterns includes L frequency hopping portions. At least two candidate frequency hopping patterns in the K candidate frequency hopping patterns include a same frequency hopping portion, K is an integer greater than 1, and L is an integer greater than 1.

14 Claims, 8 Drawing Sheets

(51) Int. Cl.
*H04W 72/044* (2023.01)
*H04W 72/0446* (2023.01)
*H04W 72/0453* (2023.01)

(52) U.S. Cl.
CPC ... *H04W 72/0446* (2013.01); *H04W 72/0453* (2013.01); *H04W 72/0466* (2013.01)

(58) Field of Classification Search
CPC .......... H04W 72/0453; H04W 72/0466; H04B 1/692; H04B 1/713; H04B 1/7143
See application file for complete search history.

(56) References Cited

U.S. PATENT DOCUMENTS

| 2014/0307642 | A1 | 10/2014 | Nstedt et al. | |
| 2019/0029030 | A1 | 1/2019 | Zou et al. | |
| 2021/0029743 | A1* | 1/2021 | Lei | H04W 74/0836 |
| 2022/0303074 | A1* | 9/2022 | Wang | H04J 13/0003 |

FOREIGN PATENT DOCUMENTS

| EP | 3754859 A1 | 12/2020 | | |
| WO | 2009136833 A1 | 11/2009 | | |
| WO | WO-2018101874 A1 | * 6/2018 | ........... | H04B 1/7143 |
| WO | WO-2019159300 A1 | * 8/2019 | ............. | H04B 1/713 |

OTHER PUBLICATIONS

Chinese Office Action issued in corresponding Chinese Application No. 201980101808.X, dated Oct. 21, 2022, pp. 1-20.
NTT Docomo, Views on frequency hopping for PDSCH. 3GPP TSG RAN WG1 Meeting #82, Beijing, China, Aug. 24-28, 2015, R1-154527, 3 pages.
3GPP TS 36.211 V15.3.0 (Sep. 2018), 3rd Generation Partnership Project; Technical Specification Group Radio Access Network; Evolved Universal Terrestrial Radio Access (E-UTRA); Physical channels and modulation(Release 15), 237 pages.
International Search Report issued in corresponding International Application No. PCT/CN2019/123577, dated Aug. 27, 2020, pp. 1-9.

* cited by examiner

COMMUNICATION METHOD AND APPARATUS

CROSS-REFERENCE TO RELATED APPLICATIONS

This application is a continuation of International Application No. PCT/CN2019/123577, filed on Dec. 6, 2019, the disclosure of which is hereby incorporated by reference in its entirety.

TECHNICAL FIELD

This application relates to the communication field, and more specifically, to a communication method and apparatus.

BACKGROUND

User equipment (UE) accesses a network via a network device for communication. A plurality of UEs may simultaneously transmit uplink signals through frequency hopping, and the network device may simultaneously receive the uplink signals sent by the plurality of UEs. When a plurality of UEs simultaneously transmit uplink signals, if a same frequency hopping pattern is selected, a conflict occurs, affecting uplink signal transmission.

SUMMARY

One or more embodiments of this application provide a communication method and apparatus, to increase a quantity of available frequency hopping patterns and reduce a probability of a conflict between terminal devices or network devices during signal transmission.

According to a first aspect, a communication method is provided. In some embodiments, the method may be performed by a terminal device or a component (for example, a processor, a chip, or a chip system) of a terminal device, or performed by a network device or a component (for example, a processor, a chip, or a chip system) of a network device. In some embodiments, the method includes: mapping first data based on a first frequency hopping pattern, where the first frequency hopping pattern is one of K candidate frequency hopping patterns, one candidate frequency hopping pattern in the K candidate frequency hopping patterns includes L frequency hopping units, at least two candidate frequency hopping patterns in the K candidate frequency hopping patterns include a same frequency hopping unit, K is an integer greater than 1, and L is an integer greater than 1; and sending the first data to a network device or a terminal device.

A resource used to map the first data is determined by using the first frequency hopping pattern. The resource may include one or more of a time domain resource, a frequency domain resource, or a code domain resource.

In some embodiments, L may be equal to a quantity of time domain resource units included in a time domain resource used to map the first data.

That one candidate frequency hopping pattern in the K candidate frequency hopping patterns includes L frequency hopping units may be understood as follows: Each of the K candidate frequency hopping patterns includes L frequency hopping units.

In some embodiments, at least two candidate frequency hopping patterns in the K candidate frequency hopping patterns include a same frequency hopping unit, that is, overlap is allowed between the K candidate frequency hopping patterns. The terminal device or the network device can select one frequency hopping pattern from the K candidate frequency hopping patterns to map the first data. This increases a quantity of candidate frequency hopping patterns that can be supported by the terminal device and the network device, and reduces a probability of a conflict between terminal devices or network devices during signal transmission.

With reference to the first aspect, in some embodiments of the first aspect, one of the L frequency hopping units includes one frequency domain resource unit in frequency domain and includes one time domain resource unit in time domain.

In some embodiments, that one of the L frequency hopping units includes one frequency domain resource unit in frequency domain and includes one time domain resource unit in time domain may be understood as follows: Each of the L frequency hopping units includes one frequency domain resource unit in frequency domain and includes one time domain resource unit in time domain.

For example, one time domain resource unit may include at least one frame (frame), at least one subframe (subframe), at least one slot (slot), at least one mini-slot (mini-slot), at least one time domain symbol, or the like. This is not limited in this embodiment of this application.

For example, one frequency domain resource unit may include at least one carrier (carrier), at least one component carrier (CC), at least one bandwidth part (BWP), at least one resource block group (RBG), at least one physical resource-block group (PRG), at least one resource block (RB), at least one subcarrier (SC), or the like. This is not limited in this embodiment of this application.

As described above, one time domain resource unit may include a plurality of time domain symbols. For example, the plurality of time domain symbols may correspond to one physical random access channel (PRACH) symbol group. The PRACH symbol group may be understood as a group including time domain symbols used to carry a PRACH.

Examples of the candidate frequency hopping pattern are provided below.

For example, one time domain resource unit may be one PRACH symbol group, and one frequency domain resource unit may be one subcarrier. The first data may be a PRACH preamble. The terminal device may map the first data to a time-frequency resource corresponding to the first frequency hopping pattern. Time domain resources for one transmission of the PRACH preamble may include four PRACH symbol groups. If two repeated transmissions of the PRACH preamble are performed, eight PRACH symbol groups are required. In other words, time domain resources for two transmissions of the PRACH preamble include eight PRACH symbol groups. In this case, L may be equal to a quantity of time domain resource units included in the eight PRACH symbol groups, that is, L is 8. One candidate frequency hopping pattern includes eight frequency hopping units. The candidate frequency hopping pattern is used to determine subcarriers transmitted in each of the eight PRACH symbol groups.

For another example, one time domain resource unit may be one slot, and one frequency domain resource unit may be one subcarrier. The first data may be a PRACH preamble. The terminal device may map the first data to a time-frequency resource corresponding to the first frequency hopping pattern. Time domain resources for one transmission of the PRACH preamble may include one slot, and time domain resources for four repeated transmissions of the PRACH preamble include four slots. In this case, L may be equal to a quantity of time domain resource units included in the four slots, that is, a quantity of repeated transmissions of the PRACH preamble. In other words, L is 4. One candidate frequency hopping pattern includes four frequency hopping units. A time-frequency resource for one transmission of the PRACH preamble is one frequency hopping unit. The candidate frequency hopping pattern is used to determine subcarriers transmitted in each of the four slots.

With reference to the first aspect, in some embodiments of the first aspect, an index of the frequency domain resource unit is related to L.

With reference to the first aspect, in some embodiments of the first aspect, the index of the frequency domain resource unit is related to M. M represents a quantity of frequency domain resource units included in a frequency domain resource that can be used to map the first data.

The frequency domain resource units included in the frequency domain resource that can be used to map the first data may be understood as candidate frequency domain resource units.

For example, the frequency domain resource that can be used to map the first data may include 12 subcarriers, and one frequency domain resource unit may include one subcarrier. In this case, M is equal to 12.

With reference to the first aspect, in some embodiments of the first aspect, the index of the frequency domain resource unit meets:

$$\Sigma_{l=0}^{L-1}((m_{k,l}-l) \bmod M) \times M^l = (\Sigma_{i=0}^{P} c((k+1) \times \theta + i) \times 2^i) \bmod M^L$$

where $m_{k,l}$ is the index of the frequency domain resource unit, $m_{k,l}$ is an integer less than or equal to M−1, M represents the quantity of candidate frequency domain resource units included in the frequency domain resource used to map the first data, the frequency domain resource unit is one of the candidate frequency domain resource units, k represents an index of the candidate frequency hopping pattern, k is an integer less than or equal to K−1, l represents an index of the time domain resource unit, l is an integer less than or equal to L−1, c(n) represents a Gold (gold) sequence, p represents a parameter related to a length of the Gold sequence, and θ represents a related parameter.

In some embodiments, the length of the Gold sequence may be $2^p$·p may be a length of a shift register that generates the Gold sequence.

An initialization value $c_{init}$ of the Gold sequence may be predefined or may be configured by the network device for the terminal device. θ may be predefined or may be configured by the network device for the terminal device.

According to at least this embodiment of this application, the manner of generating the candidate frequency hopping pattern can control an overlap degree of frequency hopping patterns, so that the network device side or the terminal device side can detect the first data by using a compressive sensing algorithm, thereby improving detection accuracy.

With reference to the first aspect, in some embodiments of the first aspect, one of the L frequency hopping units includes one code domain resource unit in code domain, the code domain resource unit is one of V candidate code domain resource units, and V is an integer greater than 1.

That one of the L frequency hopping units includes one code domain resource unit in code domain may be understood as follows: Each of the L frequency hopping units includes one code domain resource unit in code domain.

The first data may include one or more code domain resource units. For example, the first data may include one code domain resource unit. In other words, the first data is one of the V candidate code domain resource units. Corresponding first data in different time domain resource units may be the same or different. The terminal device or the network device may map, based on the candidate frequency hopping patterns, the first data corresponding to each of the L frequency hopping units to a time domain resource unit and a frequency domain resource unit corresponding to the frequency hopping unit. For another example, the first data may include L code domain resource units in the L frequency hopping units, and the L code domain resource units may be the same or different. The terminal device or the network device may map, based on the candidate frequency hopping patterns, the L code domain resource units in the first data to time domain resource units and frequency domain resource units corresponding to the L frequency hopping units respectively.

As an example, one code domain resource unit may be one sequence. Every two of V candidate sequences may be orthogonal.

Examples of the candidate frequency hopping pattern are provided below. For example, one time domain resource unit may be one slot, one frequency domain resource unit may be one subcarrier, and one code domain resource unit is one sequence. The first data may be a PRACH preamble. The terminal device may map the first data to a time-frequency resource corresponding to the first frequency hopping pattern. Time domain resources for one transmission of the PRACH preamble may include one slot, and time domain resources for four repeated transmissions of the PRACH preamble include four slots. In this case, L may be equal to a quantity of time domain resource units included in the four slots, that is, a quantity of repeated transmissions of the PRACH preamble. In other words, L is 4. One candidate frequency hopping pattern includes four frequency hopping units. The candidate frequency hopping pattern is used to determine subcarriers and sequences transmitted in each of the four slots.

According to at least this embodiment of this application, the code domain resource unit is introduced into a single frequency domain resource unit, for example, a time-domain orthogonal sequence is introduced. This can further increase a quantity of candidate frequency hopping patterns, and reduce a probability of a conflict between terminal devices or network devices during signal transmission.

With reference to the first aspect, in some embodiments of the first aspect, the index of the frequency domain resource unit is related to L and V, and an index of the code domain resource unit is related to L and V.

With reference to the first aspect, in some embodiments of the first aspect, the index of the frequency domain resource unit is related to M, and the index of the code domain resource unit is related to M. M represents a quantity of frequency domain resource units included in a frequency domain resource that can be used to map the first data.

With reference to the first aspect, in some embodiments of the first aspect, the index of the frequency domain resource unit and the index of the code domain resource unit meet:

$$\Sigma_{l=0}^{L-1}((12 \times v_{k,l} + m_{k,l} - l) \bmod (M \times V)) \times (M \times V)^l = (\Sigma_{i=0}^{P} c((k+1) \times \theta + i) \times 2^i) \bmod (M \times V)^L$$

where $m_{k,l}$ is the index of the frequency domain resource unit, $m_{k,l}$ is an integer less than or equal to M−1, M represents the quantity of candidate frequency domain resource units included in the frequency domain resource used to map the first data, the frequency domain resource unit is one of the candidate frequency domain resource units, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, l is an integer less than or equal to L−1, c(n) represents the Gold sequence, p represents the parameter related to the length of the Gold sequence, and θ represents a related parameter.

In some embodiments the length of the Gold sequence may be $2^p$·p may be the length of the shift register that generates the Gold sequence.

The initialization value $c_{init}$ of the Gold sequence may be predefined or may be configured by the network device for the terminal device. θ may be predefined or may be configured by the network device for the terminal device.

According to at least this embodiment of this application, the manner of generating the candidate frequency hopping pattern can control an overlap degree of frequency hopping patterns, so that the network device side or the terminal device side can detect the first data by using a compressive sensing algorithm, thereby improving detection accuracy.

With reference to the first aspect, in some embodiments of the first aspect, the code domain resource unit is related to the index of the code domain resource unit and a quantity N of symbols of the time domain resource unit, and N is a positive integer.

With reference to the first aspect, in some embodiments of the first aspect, the code domain resource unit is a sequence $x_{v_{k,l}}(n)$, and the sequence $x_{v_{k,l}}(n)$ meets:

$$x_{v_{k,l}}(n)=\exp(j\times\pi\times(\varphi(n)/4)+3\times v_{k,l}\times n/7)$$

where n is an index of the symbol in the time domain resource unit, n is an integer less than or equal to N−1, j is an imaginary unit, φ(n) is a preset sequence, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, and l is an integer less than or equal to L−1.

With reference to the first aspect, in some embodiments of the first aspect, one of the L frequency hopping units includes one frequency domain resource unit in frequency domain and includes one time domain resource unit in time domain, and one of the L frequency hopping units corresponds to one frequency hopping sub-pattern in the frequency domain resource unit and one frequency hopping sub-pattern in the time domain resource unit. The frequency hopping sub-pattern is one of H candidate frequency hopping sub-patterns. One of the H candidate frequency hopping sub-patterns includes a plurality of frequency hopping sub-units.

According to at least this embodiment of this application, the frequency hopping sub-pattern is introduced into a frequency domain resource unit and a time domain resource unit, that is, two-layer frequency hopping is introduced, increasing a dimension of the frequency hopping unit. This can further increase a quantity of candidate frequency hopping patterns, and reduce a probability of a conflict between terminal devices or network devices during signal transmission. For one candidate frequency hopping pattern, different frequency hopping sub-patterns are orthogonal. This increases a probability of correct detection to some extent, and improves detection performance of the network device or the terminal device.

With reference to the first aspect, in some embodiments of the first aspect, one of the plurality of frequency hopping sub-units includes one frequency domain resource sub-unit in frequency domain and includes one time domain resource sub-unit in time domain.

Alternatively, it may be understood that a correspondence between different time domain resource sub-units and frequency domain resource sub-units may be determined based on candidate frequency hopping sub-patterns.

A length of one time domain resource sub-unit is less than a length of one time-frequency resource unit. One time domain resource sub-unit includes at least one frame, at least one subframe, at least one slot, at least one mini-slot, at least one time domain symbol, or the like, provided that the length of the time domain resource sub-unit is less than the length of the time domain resource unit. This embodiment of this application imposes no limitation on a form of the time domain resource sub-unit.

A quantity of subcarriers in one frequency domain resource sub-unit is less than a quantity of subcarriers in one frequency domain resource unit. One frequency domain resource sub-unit may include at least one carrier, at least one component carrier, at least one bandwidth part, at least one resource block group, at least one physical resource block group, at least one resource block, or at least one subcarrier, provided that the quantity of subcarriers in one frequency domain resource sub-unit is less than the quantity of subcarriers in one frequency domain resource unit. This embodiment of this application imposes no limitation on a form of the frequency domain resource sub-unit.

Examples of the candidate frequency hopping pattern are provided below.

For example, one time domain resource unit is one slot, and one frequency domain resource unit is one subcarrier group. The first data may be a PRACH preamble. The terminal device may map the first data to a time-frequency resource corresponding to the first frequency hopping pattern. Time domain resources for one transmission of the PRACH preamble may include one slot, and time domain resources for four repeated transmissions of the PRACH preamble include four slots. In this case, L is a quantity of time domain resource units included in the four slots, that is, a quantity of repeated transmissions of the PRACH preamble. In other words, L is 4. One candidate frequency hopping pattern includes four frequency hopping units. The candidate frequency hopping pattern is used to determine corresponding subcarrier groups and candidate frequency hopping sub-patterns in each of the four slots. One slot may include N OFDM symbols. When one time domain resource sub-unit is one OFDM symbol and one frequency domain resource sub-unit is one subcarrier, the candidate frequency hopping sub-pattern is used to determine corresponding subcarriers on each of the N OFDM symbols. In other words, subcarriers corresponding to different OFDM symbols may be different.

With reference to the first aspect, in some embodiments of the first aspect, a correspondence between a frequency domain resource unit in each frequency hopping unit in the L frequency hopping units and a time domain resource unit in the frequency hopping unit is determined by a candidate intermediate pattern.

The candidate frequency hopping pattern may be used to determine frequency domain resource units corresponding to different time domain resource units and candidate frequency hopping sub-patterns corresponding to different time domain resource units. Alternatively, it may be understood that the candidate frequency hopping pattern may be used to determine the candidate intermediate pattern and candidate frequency hopping sub-patterns corresponding to different time domain resource units in the candidate intermediate pattern.

With reference to the first aspect, in some embodiments of the first aspect, an index of the candidate intermediate pattern is related to L and H, and an index of the candidate frequency hopping sub-pattern is related to L and H.

With reference to the first aspect, in some embodiments of the first aspect, the index of the candidate intermediate pattern is related to Y, and the index of the candidate frequency hopping sub-pattern is related to Y, where Y represents a quantity of candidate intermediate patterns.

With reference to the first aspect, in some embodiments of the first aspect, the index of the candidate intermediate pattern and the index of the candidate frequency hopping sub-pattern meet:

$$\Sigma_{l=0}^{L}(12 \times h_{k,l} + y_k - l) \bmod(Y \times H)) \times (H \times Y)^l = (\Sigma_{i=0}^{p} c((k+1) \times \theta + i) \times 2^i) \bmod(H \times Y)^L$$

where $y_k$ represents the index of the candidate intermediate pattern, $y_k$ is an integer less than or equal to Y−1, k represents the index of the candidate frequency hopping pattern, k is an integer less than or equal to K−1, l represents the index of the time domain resource unit, l is an integer less than or equal to L−1, c(n) represents a Gold sequence, p represents a parameter related to a length of the Gold sequence, θ represents a related parameter, $h_{k,l}$ represents the index of the candidate frequency hopping sub-pattern, that is, represents an index of a candidate frequency hopping sub-pattern that is determined by a $k^{th}$ candidate frequency hopping pattern and that is corresponding to an $l^{th}$ time domain resource unit, and $h_{k,l}$ is an integer less than or equal to H−1.

The length of the Gold sequence may be $2^p$·p may be the length of the shift register that generates the Gold sequence.

The initialization value $c_{init}$ of the Gold sequence may be predefined or may be configured by the network device for the terminal device. θ may be predefined or may be configured by the network device for the terminal device.

According to at least this embodiment of this application, the manner of generating the candidate frequency hopping pattern can control an overlap degree of frequency hopping patterns, so that the network device side or the terminal device side can detect the first data by using a compressive sensing algorithm, thereby improving detection accuracy.

According to a second aspect, a communication method is provided. The method may be performed by a terminal device or a component (for example, a processor, a chip, or a chip system) of a terminal device, or performed by a network device or a component (for example, a processor, a chip, or a chip system) of a network device. The method includes: receiving first data from a network device or a terminal device; demapping the first data based on a first frequency hopping pattern, where the first frequency hopping pattern is one of K candidate frequency hopping patterns, one candidate frequency hopping pattern in the K candidate frequency hopping patterns includes L frequency hopping units, at least two candidate frequency hopping patterns in the K candidate frequency hopping patterns include a same frequency hopping unit, K is an integer greater than 1, and L is an integer greater than 1.

A resource used to map the first data is determined by using the first frequency hopping pattern. The resource may include one or more of a time domain resource, a frequency domain resource, or a code domain resource.

That one candidate frequency hopping pattern in the K candidate frequency hopping patterns includes L frequency hopping units may be understood as follows: Each of the K candidate frequency hopping patterns includes L frequency hopping units.

According to at least this embodiment of this application, at least two candidate frequency hopping patterns in the K candidate frequency hopping patterns include a same frequency hopping unit, that is, overlap is allowed between the K candidate frequency hopping patterns. Therefore, the terminal device or the network device can select one frequency hopping pattern from the K candidate frequency hopping patterns to map the first data. This reduces a probability of a conflict between terminal devices or network devices during signal transmission, and increases a quantity of candidate frequency hopping patterns that can be supported by the terminal device and the network device.

With reference to the second aspect, in some embodiments of the second aspect, one of the L frequency hopping units includes one frequency domain resource unit in frequency domain and includes one time domain resource unit in time domain.

L may be equal to a quantity of time domain resource units included in a time domain resource that can be used to map the first data.

That one of the L frequency hopping units includes one frequency domain resource unit in frequency domain and includes one time domain resource unit in time domain may be understood as follows: Each of the L frequency hopping units includes one frequency domain resource unit in frequency domain and includes one time domain resource unit in time domain.

For example, one time domain resource unit may include at least one frame, at least one subframe (sub-frame), at least one slot (slot), at least one mini-slot (mini-slot), at least one time domain symbol, or the like. This is not limited in this embodiment of this application.

For example, one frequency domain resource unit may include at least one carrier (carrier), at least one component carrier (CC), at least one bandwidth part (BWP), at least one resource block group (RBG), at least one physical resource-block group (PRG), at least one resource block (RB), at least one subcarrier (SC), or the like. This is not limited in this embodiment of this application.

As described above, one time domain resource unit may include a plurality of time domain symbols. For example, the plurality of time domain symbols may correspond to one physical random access channel (PRACH) symbol group. Examples of the candidate frequency hopping pattern are provided below.

For example, one time domain resource unit may be one PRACH symbol group, and one frequency domain resource unit may be one subcarrier. The first data may be a PRACH preamble. The terminal device may map the first data to a time-frequency resource corresponding to the first frequency hopping pattern. Time domain resources for one transmission of the PRACH preamble may include four PRACH symbol groups. If two repeated transmissions of the PRACH preamble are performed, eight PRACH symbol groups are required. In other words, time domain resources for two transmissions of the PRACH preamble include eight PRACH symbol groups. In this case, L may be equal to a quantity of time domain resource units included in the eight PRACH symbol groups, that is, L is 8. One candidate frequency hopping pattern includes eight frequency hopping units. The candidate frequency hopping pattern is used to determine subcarriers transmitted in each of the eight PRACH symbol groups.

For another example, one time domain resource unit may be one slot, and one frequency domain resource unit may be one subcarrier. The first data may be a PRACH preamble. The terminal device may map the first data to a time-frequency resource corresponding to the first frequency hopping pattern. Time domain resources for one transmission of the PRACH preamble may include one slot, and time domain resources for four repeated transmissions of the PRACH preamble include four slots. In this case, L may be equal to a quantity of time domain resource units included in the four slots, that is, a quantity of repeated transmissions of the PRACH preamble. In other words, L is 4. One candidate frequency hopping pattern includes four frequency hopping units. A time-frequency resource for one transmission of the PRACH preamble is one frequency hopping unit. The candidate frequency hopping pattern is used to determine subcarriers transmitted in each of the four slots.

With reference to the second aspect, in some embodiments of the second aspect, an index of the frequency domain resource unit is related to L.

With reference to the second aspect, in some embodiments of the second aspect, the index of the frequency domain resource unit is related to M. M represents a quantity of frequency domain resource units included in a frequency domain resource that can be used to map the first data.

The frequency domain resource units included in the frequency domain resource that can be used to map the first data may be understood as candidate frequency domain resource units.

For example, the frequency domain resource that can be used to map the first data may include 12 subcarriers, and one frequency domain resource unit may include one subcarrier. In this case, M is equal to 12.

With reference to the second aspect, in some embodiments of the second aspect, the index of the frequency domain resource unit meets:

$$\Sigma_{i=0}^{L-1}((m_{k,l}-l) \bmod M) \times M^l = (\Sigma_{i=0}^{P} c((k+1) \times \theta + i) \times 2^i) \bmod M^L$$

where $m_{k,l}$ is the index of the frequency domain resource unit, $m_{k,l}$ is an integer less than or equal to M−1, M represents the quantity of candidate frequency domain resource units included in the frequency domain resource used to map the first data, the frequency domain resource unit is one of the candidate frequency domain resource units, k represents an index of the candidate frequency hopping pattern, k is an integer less than or equal to K−1, l represents an index of the time domain resource unit, l is an integer less than or equal to L−1, c(n) represents a Gold sequence, p represents a parameter related to a length of the Gold sequence, and θ represents a related parameter.

In some embodiments the length of the Gold sequence may be $2^p$. p may be a length of a shift register that generates the Gold sequence.

An initialization value $c_{init}$ of the Gold sequence may be predefined or may be configured by the network device for the terminal device. θ may be predefined or may be configured by the network device for the terminal device.

According to at least this embodiment of this application, the manner of generating the candidate frequency hopping pattern can control an overlap degree of frequency hopping patterns, so that the network device side or the terminal device side can detect the first data by using a compressive sensing algorithm, thereby improving detection accuracy.

With reference to the second aspect, in some embodiments of the second aspect, one of the L frequency hopping units includes one code domain resource unit in code domain, the code domain resource unit is one of V candidate code domain resource units, and V is an integer greater than 1.

That one of the L frequency hopping units includes one code domain resource unit in code domain may be understood as follows: Each of the L frequency hopping units includes one code domain resource unit in code domain.

The first data may include one or more code domain resource units. For example, the first data may include one code domain resource unit. In other words, the first data is one of the V candidate code domain resource units. Corresponding first data in different time domain resource units may be the same or different. The terminal device or the network device may map, based on the candidate frequency hopping patterns, the first data corresponding to each of the L frequency hopping units to a time domain resource unit and a frequency domain resource unit corresponding to the frequency hopping unit. For another example, the first data may include L code domain resource units in the L frequency hopping units, and the L code domain resource units may be the same or different. The terminal device or the network device may map, based on the candidate frequency hopping patterns, the L code domain resource units in the first data to time domain resource units and frequency domain resource units corresponding to the L frequency hopping units respectively.

As an example, one code domain resource unit may be one sequence. Every two of V candidate sequences may be orthogonal.

Examples of the candidate frequency hopping pattern are provided below.

For example, one time domain resource unit may be one slot, one frequency domain resource unit may be one subcarrier, and one code domain resource unit is one sequence. The first data may be a PRACH preamble. The terminal device may map the first data to a time-frequency resource corresponding to the first frequency hopping pattern. Time domain resources for one transmission of the PRACH preamble may include one slot, and time domain resources for four repeated transmissions of the PRACH preamble include four slots. In this case, L may be equal to a quantity of time domain resource units included in the four slots, that is, a quantity of repeated transmissions of the PRACH preamble. In other words, L is 4. One candidate frequency hopping pattern includes four frequency hopping units. The candidate frequency hopping pattern is used to determine subcarriers and sequences transmitted in each of the four slots.

According to at least this embodiment of this application, the code domain resource unit is introduced into a single frequency domain resource unit, for example, time-domain orthogonal sequences are introduced. This can further increase a quantity of candidate frequency hopping patterns, and reduce a probability of a conflict between terminal devices or network devices during signal transmission.

With reference to the second aspect, in some embodiments of the second aspect, the index of the frequency domain resource unit is related to L and V, and an index of the code domain resource unit is related to L and V.

With reference to the second aspect, in some embodiments of the second aspect, the index of the frequency domain resource unit is related to M, and the index of the code domain resource unit is related to M. M represents a quantity of frequency domain resource units included in a frequency domain resource that can be used to map the first data.

With reference to the second aspect, in some embodiments of the second aspect, the index of the frequency domain resource unit and the index of the code domain resource unit meet:

$$\Sigma_{i=0}^{L-1}((12 \times v_{k,l} + m_{k,l} - l) \bmod (M \times V)) \times (M \times V)^l = (\Sigma_{i=0}^{p} c((k+1) \times \theta + i) \times 2^i) \bmod (M \times V)^L$$

where $m_{k,l}$ is the index of the frequency domain resource unit, $m_{k,l}$ is an integer less than or equal to M−1, M represents the quantity of candidate frequency domain resource units included in the frequency domain resource used to map the first data, the frequency domain resource unit is one of the candidate frequency domain resource units, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, l is an integer less than or equal to L−1, c(n) represents the Gold sequence, p represents the parameter related to the length of the Gold sequence, and θ represents a related parameter.

In some embodiments the length of the Gold sequence may be $2^p \cdot p$ may be the length of the shift register that generates the Gold sequence.

The initialization value $c_{init}$ of the Gold sequence may be predefined or may be configured by the network device for the terminal device. θ may be predefined or may be configured by the network device for the terminal device. According to at least this embodiment of this application, the manner of generating the candidate frequency hopping pattern can control an overlap degree of frequency hopping patterns, so that the network device side or the terminal device side can detect the first data by using a compressive sensing algorithm, thereby improving detection accuracy.

With reference to the second aspect, in some embodiments of the second aspect, the code domain resource unit is related to the index of the code domain resource unit and a quantity N of symbols of the time domain resource unit, and N is a positive integer.

With reference to the second aspect, in some embodiments of the second aspect, the code domain resource unit is a sequence $x_{v_{k,l}}(n)$, and the sequence $x_{v_{k,l}}(n)$ meets:

$$x_{v_{k,l}}(n) = \exp(j \times \pi \times (\varphi(n)/4) + 3 \times v_{k,l} \times n/7)$$

where n is an index of the symbol in the time domain resource unit, n is an integer less than or equal to N−1, j is an imaginary unit, φ(n) is a preset sequence, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, and l is an integer less than or equal to L−1.

With reference to the second aspect, in some embodiments of the second aspect, one of the L frequency hopping units includes one frequency domain resource unit in frequency domain and includes one time domain resource unit in time domain, and one of the L frequency hopping units corresponds to one frequency hopping sub-pattern in the frequency domain resource unit and one frequency hopping sub-pattern in the time domain resource unit. The frequency hopping sub-pattern is one of H candidate frequency hopping sub-patterns. One of the H candidate frequency hopping sub-patterns includes a plurality of frequency hopping sub-units.

According to at least this embodiment of this application, the frequency hopping sub-pattern is introduced into a frequency domain resource unit and a time domain resource unit, that is, two-layer frequency hopping is introduced, increasing a dimension of the frequency hopping unit. This can further increase a quantity of candidate frequency hopping patterns, and reduce a probability of a conflict between terminal devices or network devices during signal transmission. For one candidate frequency hopping pattern, different frequency hopping sub-patterns are orthogonal. This increases a probability of correct detection to some extent, and improves detection performance of the network device or the terminal device.

With reference to the second aspect, in some embodiments of the second aspect, one of the plurality of frequency hopping sub-units includes one frequency domain resource sub-unit in frequency domain and includes one time domain resource sub-unit in time domain.

Alternatively, it may be understood that the candidate frequency hopping sub-pattern may be used to determine frequency domain resource sub-units corresponding to different time domain resource sub-units.

A length of one time domain resource sub-unit is less than a length of one time-frequency resource unit. One time domain resource sub-unit includes at least one frame, at least one subframe, at least one slot, at least one mini-slot, at least one time domain symbol, or the like, provided that the length of the time domain resource sub-unit is less than the length of the time domain resource unit. This embodiment of this application imposes no limitation on a form of the time domain resource sub-unit.

A quantity of subcarriers in one frequency domain resource sub-unit is less than a quantity of subcarriers in one frequency domain resource unit. One frequency domain resource sub-unit may include at least one carrier, at least one component carrier, at least one bandwidth part, at least one resource block group, at least one physical resource block group, at least one resource block, or at least one subcarrier, provided that the quantity of subcarriers in one frequency domain resource sub-unit is less than the quantity of subcarriers in one frequency domain resource unit. This embodiment of this application imposes no limitation on a form of the frequency domain resource sub-unit.

Examples of the candidate frequency hopping pattern are provided below.

For example, one time domain resource unit is one slot, and one frequency domain resource unit is one subcarrier group. The first data may be a PRACH preamble. The terminal device may map the first data to a time-frequency resource corresponding to the first frequency hopping pattern. Time domain resources for one transmission of the PRACH preamble may include one slot, and time domain resources for four repeated transmissions of the PRACH preamble include four slots. In this case, L is a quantity of time domain resource units included in the four slots, that is, a quantity of repeated transmissions of the PRACH preamble. In other words, L is 4. One candidate frequency hopping pattern includes four frequency hopping units. The candidate frequency hopping pattern is used to determine corresponding subcarrier groups and candidate frequency hopping sub-patterns in each of the four slots. One slot may include N OFDM symbols. When one time domain resource sub-unit is one OFDM symbol and one frequency domain resource sub-unit is one subcarrier, the candidate frequency hopping sub-pattern is used to determine corresponding subcarriers on each of the N OFDM symbols. In other words, subcarriers corresponding to different OFDM symbols may be different.

With reference to the second aspect, in some embodiments of the second aspect, a correspondence between a frequency domain resource unit in each frequency hopping unit in the L frequency hopping units and a time domain resource unit in the frequency hopping unit is determined by a candidate intermediate pattern.

The candidate frequency hopping pattern may be used to determine frequency domain resource units corresponding to different time domain resource units and candidate frequency hopping sub-patterns corresponding to different time domain resource units. Alternatively, it may be understood that the candidate frequency hopping pattern may be used to determine the candidate intermediate pattern and candidate frequency hopping sub-patterns corresponding to different time domain resource units in the candidate intermediate pattern.

With reference to the second aspect, in some embodiments of the second aspect, an index of the candidate intermediate pattern is related to L and H, and an index of the candidate frequency hopping sub-pattern is related to L and H.

With reference to the second aspect, in some embodiments of the second aspect, the index of the candidate intermediate pattern is related to Y, and the index of the candidate frequency hopping sub-pattern is related to Y, where Y represents a quantity of candidate intermediate patterns.

With reference to the second aspect, in some embodiments of the second aspect, the index of the candidate intermediate pattern and the index of the candidate frequency hopping sub-pattern meet:

$$\Sigma_{l=0}^{L}(12 \times h_{k,l}+y_k-l) \bmod(Y \times H)) \times (H \times Y)^l = (\Sigma_{i=0}^{P} c((k+1) \times \theta + i) \times 2^i) \bmod(H \times Y)^L$$

where $y_k$ represents the index of the candidate intermediate pattern, $y_k$ is an integer less than or equal to $Y-1$, k represents the index of the candidate frequency hopping pattern, k is an integer less than or equal to $K-1$, l represents the index of the time domain resource unit, l is an integer less than or equal to $L-1$, c(n) represents a Gold sequence, p represents a parameter related to a length of the Gold sequence, $\theta$ represents a related parameter, $h_{k,l}$ represents the index of the candidate frequency hopping sub-pattern, that is, represents an index of a candidate frequency hopping sub-pattern that is determined by a $k^{th}$ candidate frequency hopping pattern and that is corresponding to an $l^{th}$ time domain resource unit, and $h_{k,l}$ is an integer less than or equal to $H-1$.

The length of the Gold sequence may be $2^p \cdot p$ may be the length of the shift register that generates the Gold sequence. The initialization value $c_{init}$ of the Gold sequence may be predefined or may be configured by the network device for the terminal device. $\theta$ may be predefined or may be configured by the network device for the terminal device.

According to at least this embodiment of this application, the manner of generating the candidate frequency hopping pattern can control an overlap degree of frequency hopping patterns, so that the network device side or the terminal device side can detect the first data by using a compressive sensing algorithm, thereby improving detection accuracy.

According to a third aspect, a communication apparatus is provided to perform the method in the first aspect. Specifically, the communication apparatus may include modules or units, such as a processing unit and a sending unit, configured to perform the method in the first aspect. The modules or units included in the apparatus may be implemented by software and/or hardware. As an example, the communication apparatus is a communication device, or a chip or another component disposed in a communication device, where the communication device may be a network device or a terminal device.

The processing unit is configured to map first data based on a first frequency hopping pattern, where the first frequency hopping pattern is one of K candidate frequency hopping patterns, one candidate frequency hopping pattern in the K candidate frequency hopping patterns includes L frequency hopping units, L is an integer greater than 1, at least two candidate frequency hopping patterns in the K candidate frequency hopping patterns include a same frequency hopping unit, K is an integer greater than 1, and L is an integer greater than 1. The sending unit is configured to send the first data to a network device or a terminal device.

According to at least this embodiment of this application, at least two candidate frequency hopping patterns in the K candidate frequency hopping patterns include a same frequency hopping unit, that is, overlap is allowed between the K candidate frequency hopping patterns. The terminal device or the network device can select one frequency hopping pattern from the K candidate frequency hopping patterns to map the first data. This increases a quantity of candidate frequency hopping patterns that can be supported by the terminal device and the network device, and reduces a probability of a conflict between terminal devices or network devices during signal transmission.

With reference to the third aspect, in some embodiments of the third aspect, one of the L frequency hopping units includes one frequency domain resource unit in frequency domain and includes one time domain resource unit in time domain.

With reference to the third aspect, in some embodiments of the third aspect, one of the L frequency hopping units includes one code domain resource unit in code domain, the code domain resource unit is one of V candidate code domain resource units, and V is an integer greater than 1.

It should be understood that, the method in the first aspect may be specifically the method in any one of the first aspect and the embodiments of the first aspect.

According to a fourth aspect, a communication apparatus is provided to perform the method in the second aspect. Specifically, the communication apparatus may include modules or units, such as a receiving unit and a processing unit, configured to perform the method in the second aspect. The modules or units included in the apparatus may be implemented by software and/or hardware. As an example, the communication apparatus is a communication device, or a chip or another component disposed in a communication device, where the communication device may be a network device or a terminal device.

The receiving unit is configured to receive first data from a network device or a terminal device. The processing unit is configured to demap the first data based on a first frequency hopping pattern, where the first frequency hopping pattern is one of K candidate frequency hopping patterns, one candidate frequency hopping pattern in the K candidate frequency hopping patterns includes L frequency hopping units, at least two candidate frequency hopping patterns in the K candidate frequency hopping patterns include a same frequency hopping unit, K is an integer greater than 1, and L is an integer greater than 1.

According to at least this embodiment of this application, at least two candidate frequency hopping patterns in the K candidate frequency hopping patterns include a same frequency hopping unit, that is, overlap is allowed between the K candidate frequency hopping patterns. The terminal device or the network device can select one frequency hopping pattern from the K candidate frequency hopping patterns to map the first data. This increases a quantity of candidate frequency hopping patterns that can be supported by the terminal device and the network device, and reduces a probability of a conflict between terminal devices or network devices during signal transmission.

With reference to the fourth aspect, in some embodiments of the fourth aspect, one of the L frequency hopping units includes one frequency domain resource unit in frequency domain and includes one time domain resource unit in time domain.

With reference to the fourth aspect, in some embodiments of the fourth aspect, one of the L frequency hopping units includes one code domain resource unit in code domain, the code domain resource unit is one of V candidate code domain resource units, and V is an integer greater than 1.

It should be understood that the method in the second aspect may refer to the method in any one of the second aspect and the embodiments of the second aspect.

According to a fifth aspect, a communication apparatus is provided. The communication apparatus is configured to perform the method in the first aspect or the second aspect.

According to a sixth aspect, a communication apparatus is provided. The communication apparatus includes a processor, where the processor is coupled to a memory. The memory is configured to store a program or instructions. When the program or the instructions is/are executed by the processor, the apparatus is enabled to perform the method in the first aspect or the second aspect.

According to a seventh aspect, a computer program product is provided, where the computer program product includes computer program code. When the computer program code is run on a computer, the computer is enabled to perform the method in the first aspect or the second aspect.

According to an eighth aspect, a chip is provided. The chip includes a processor, where the processor is coupled to a memory. The memory is configured to store a program or instructions. When the program or the instructions is/are executed by the processor, the processor is enabled to perform the method in the first aspect or the second aspect.

According to a ninth aspect, a computer-readable storage medium is provided. The computer-readable storage medium stores a computer program or instructions. When the computer program or the instructions is/are run, a computer is enabled to perform the method in the first aspect or the second aspect.

It should be understood that, the method in the first aspect may be specifically the method in any one of the first aspect and the embodiments of the first aspect. The method in the second aspect may be specifically the method in any one of the second aspect and the embodiments of the second aspect.

DESCRIPTION OF EMBODIMENTS

Figure 1:
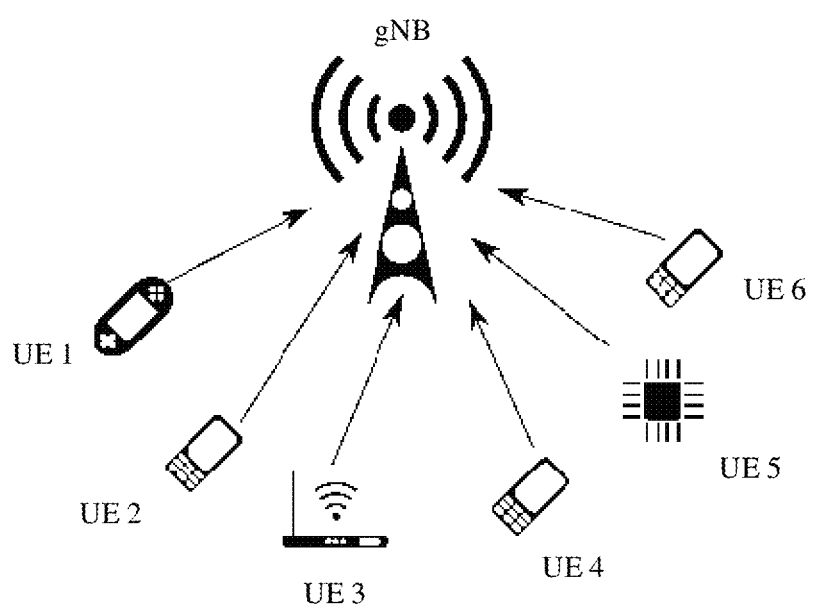
FIG. 1 is a schematic diagram of an architecture of a communication system according to an embodiment of this application.

The following describes the technical solutions of this application with reference to the accompanying drawings.

The technical solutions in embodiments of this application may be applied to various communication systems such as a long term evolution (LTE) system, an LTE frequency division duplex (FDD) system, an LTE time division duplex (TDD) system, a $5^{th}$ generation (5G) system, a new radio (NR) system or a future-evolved communication system, vehicle-to-X (V2X), long term evolution-vehicle (LTE-V), Internet of vehicles, machine type communication (MTC), Internet of things (IoT), long term evolution-machine (LTE-M), and machine to machine (M2M). The V2X may include vehicle to network (V2N), vehicle to vehicle (V2V), vehicle to infrastructure (V2I), vehicle to pedestrian (V2P), and the like.

In embodiments of this application, a terminal device (which may also be referred to as a terminal for short) may refer to a user equipment (UE), an access terminal, a user unit, a user station, a mobile station, a remote station, a remote terminal, a mobile device, a user terminal, a wireless communication device, a user agent, or a user apparatus.

The terminal device may be a device that provides voice/data connectivity for a user, for example, a handheld device or a vehicle-mounted device that has a wireless connection function. Currently, some examples of the terminal are: a mobile phone (mobile phone), a tablet computer (pad), a notebook computer, a palmtop computer, a mobile internet device (MID), a wearable device, a virtual reality (VR) device, an augmented reality (AR) device, a terminal in industrial control (industrial control), a terminal in self driving (self driving), a terminal in a remote medical surgery (remote medical surgery), a terminal in a smart grid (smart grid), a terminal in transportation safety (transportation safety), a terminal in a smart city (smart city), a terminal in a smart home (smart home), a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a terminal device in a 5G network or a terminal device in a future evolved public land mobile network (PLMN) and/or any other suitable device for communication in a communication system. This is not limited in embodiments of this application.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn by a user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an internet of things (IoT) system. IoT is an important part of future information technology development. A main technical feature of the IoT is connecting things to networks using communication technologies, to implement an intelligent network for interconnection between persons and machines, and between things.

In addition, in this application, the terminal device may further include an intelligent printer, a train detector, a gas station or another sensor, with main functions including but not limited to collecting data, receiving control information and downlink data from a network device, transmitting uplink data to the network device, and the like.

A network device in embodiments of this application may be any device having a wireless transceiver function for communication with a terminal device. The network device may be an evolved NodeB (evolved nodeB, eNB, or eNodeB) in an LTE system, a controller in a cloud radio access network (CRAN) scenario, a radio network controller (RNC), a base station controller (BSC), a home base station (for example, a home evolved nodeB, or a home nodeB, HNB), or a baseband unit (BBU). Alternatively, the network device may be a relay station, an access point, a vehicle-mounted device, a wearable device, a network device in a 5G network, a network device in a future evolved PLMN network or the like. Alternatively, the network device may be an access point (AP), a wireless relay node, a wireless backhaul node, a transmission point (TP), a transmission and reception point (TRP), or the like in a WLAN. Alternatively, the network device may be a gNodeB (gNB) or a transmission point (TRP or TP) in a new radio (NR) system, or one or a group of antenna panels (including a plurality of antenna panels) of a base station in a 5G system. Alternatively, the network device may be a network node included in a gNB or a transmission point, for example, a baseband unit (BBU) or a distributed unit (DU). This is not limited in embodiments of this application.

In some deployments, the network device may include a centralized unit (CU) and a DU. The network device may further include an active antenna unit (AAU). The CU implements some functions of the network device, and the DU implements some functions of the network device. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. It may be understood that the network device may be a device including one or more of the CU node, the DU node, or the AAU node. In addition, the network device may be a network device in an access network (RAN), or may be a network device in a core network (CN). This is not limited in this application.

In addition, in embodiments of this application, the network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cell herein may include a metro cell (metro cell), a micro cell (micro cell), a pico cell (pico cell), a femto cell (femto cell), and the like. The small cells are characterized by small coverage and low transmit power, and are applicable to providing a high-rate data transmission service.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the method provided in embodiments of this application may be performed by the terminal device, the network device, or a functional module that is in the terminal device or the network device and that can invoke and execute the program.

In addition, aspects or features in embodiments of this application may be implemented as a method, an apparatus, or a product that uses standard programming and/or engineering technologies. The term "product" used in embodiments of this application covers a computer program that can be accessed from any computer-readable component, carrier or medium. For example, a computer-readable medium may include but is not limited to a magnetic storage component (for example, a hard disk drive, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

It should be noted that in embodiments of this application, a plurality of application programs may be run at the application layer. In this case, an application program for performing the communication method in embodiments of this application and an application program for controlling a receive end device to implement an action corresponding to received data may be different application programs.

FIG. 1 is a schematic diagram of a network architecture according to an embodiment of this application. As shown in FIG. 1, the communication system in this embodiment of this application may include a network device (for example, a gNB) and terminal devices (for example, UE 1 to UE 6). The network device may include one or more antennas. In addition, the network device may additionally include a transmitter chain and a receiver chain. A person of ordinary skill in the art may understand that the transmitter chain and the receiver chain each may include a plurality of components (such as a processor, a modulator, a multiplexer, a demodulator, a demultiplexer, or an antenna) related to signal sending and receiving. FIG. 1 is merely a simplified schematic diagram as an example. A quantity of terminal devices in the communication system in FIG. 1 is merely an example. The quantity of terminal devices in the communication system may be another quantity. In addition, the communication system may further include another communication device, which is not shown in FIG. 1. In the communication system, the terminal devices (for example, the UE 1 to the UE 6) may each send an uplink signal to the network device (for example, the gNB) based on a frequency hopping pattern, and the network device (for example, the gNB) may receive the uplink signal. In the communication system, the network device (for example, the gNB) may send a downlink signal to the terminal devices (for example, the UE 1 to the UE 6) based on a frequency hopping pattern.

Figure 2:
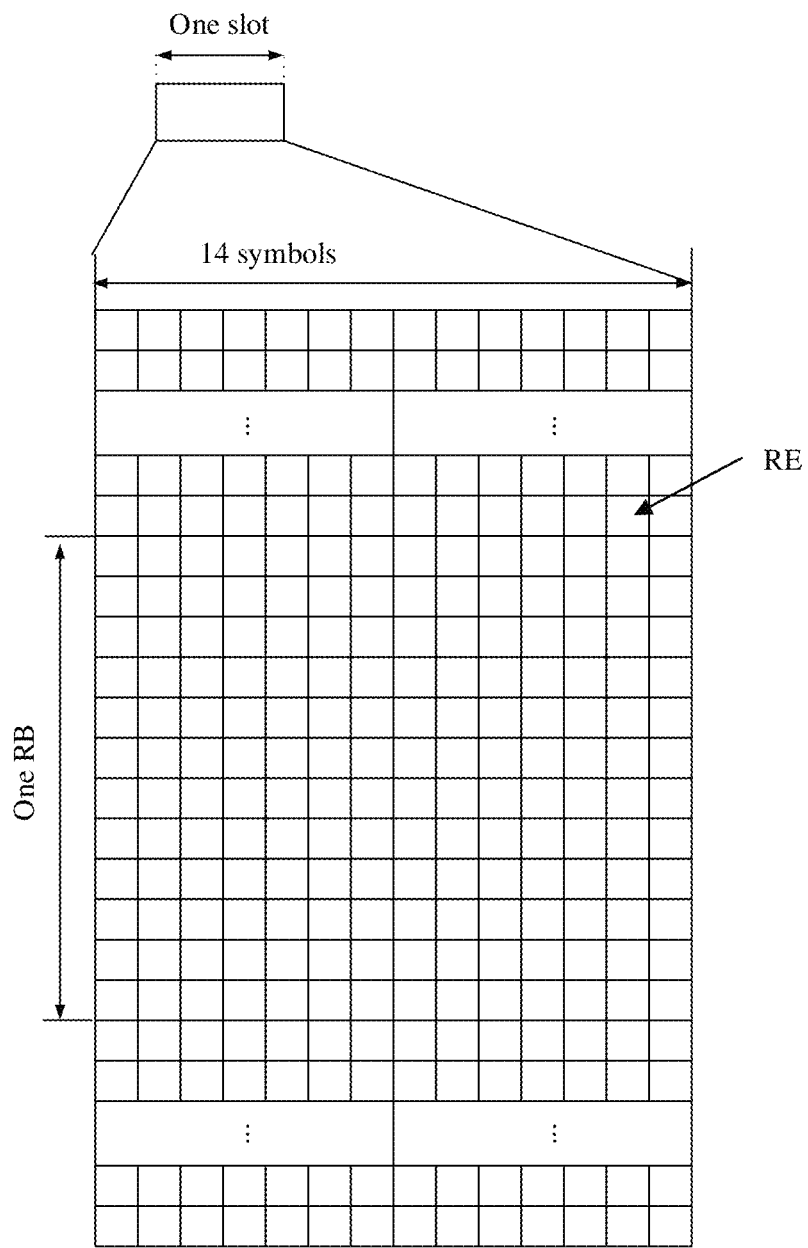
FIG. 2 is a schematic diagram of a time-frequency resource according to an embodiment of this application.

In this embodiment of this application, data or information may be carried by using a time-frequency resource. The time-frequency resource may include a resource in time domain and a resource in frequency domain. In other words, the network device and the terminal device may transmit data to each other by using the time-frequency resource. The time-frequency resource used for data transmission may be represented as a resource grid. FIG. 2 is a schematic diagram of a resource grid. In the resource grid shown in FIG. 2, a resource element (RE) is a minimum resource unit for data transmission. In other words, the RE is a minimum resource unit used to perform resource mapping on to-be-sent data. As shown in FIG. 2, one RE corresponds to one symbol in time domain, for example, an orthogonal frequency division multiplexing (OFDM) symbol or a discrete Fourier transform spread orthogonal frequency division multiplexing (DFT-s-OFDM) symbol, and one RE corresponds to one subcarrier in frequency domain. One RE may be used to map one complex symbol, for example, a modulated complex symbol, or a precoded complex symbol. This is not limited in embodiments of this application. In FIG. 2, one slot may include 14 time domain symbols, and one resource block (RB) may correspond to 12 subcarriers in frequency domain. It should be understood that FIG. 2 is only an example of a possible time-frequency resource. A specific form of the time-frequency resource is not limited in embodiments of this application.

The terminal device may transmit an uplink signal based on a frequency hopping pattern, where the frequency hopping pattern is used to determine one or more of a corresponding code domain resource unit (for example, a sequence), a time domain resource unit (for example, a symbol), and a frequency domain resource unit (for example, a subcarrier). The terminal device maps the uplink signal (for example, one or more code domain resource units) to the corresponding time domain resource unit and/or frequency domain resource unit for sending. In a frequency hopping pattern, different time domain resource units may correspond to different frequency domain resource units, and/or different time domain resource units may correspond to different code domain resource units. That the network device receives the uplink signal may be receiving uplink signals of one or more terminal devices based on the frequency hopping pattern.

The frequency hopping pattern is described by using an example of preamble transmission.

The terminal device may perform a plurality of repeated PRACH transmissions. Alternatively, it may be understood that a PRACH preamble may be repeatedly sent in time domain, and frequency domain resources for each transmission of the PRACH preamble may be determined based on the frequency hopping pattern. The determining, based on the frequency hopping pattern, the frequency domain resources for each transmission of the PRACH preamble in repeated PRACH transmissions may also be understood as mapping, based on the frequency hopping pattern, a sequence corresponding to the PRACH preamble to a time-frequency resource used to transmit the PRACH.

Figure 3:
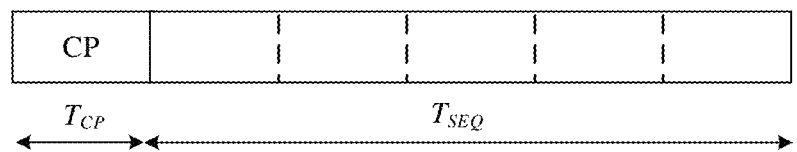
FIG. 3 is a schematic diagram of a random access symbol according to an embodiment of this application.

For example, a time domain resource for one transmission of the PRACH preamble may include four symbol groups. One symbol group may include a plurality of time domain symbols. FIG. 3 is an example diagram of a random access symbol group. As shown in FIG. 3, one symbol group includes a cyclic prefix with a length of $T_{CP}$ and a plurality of time domain symbols with a total length of $T_{SEQ}$. If two repeated transmissions of the PRACH preamble are required, time domain resources for transmissions of the PRACH preamble include eight symbol groups. A frequency domain resource that can be used to transmit the PRACH preamble may include a plurality of subcarriers. For example, the frequency domain resource that can be used to transmit the PRACH preamble may include 12 subcarriers, and respective numbers of the 12 subcarriers are {0, 1, 2, 3, 4, 5, 6, 7, 8, 9, 10, 11}. A frequency domain resource corresponding to each symbol group in one transmission of the PRACH preamble is one of the 12 subcarriers. Specifically, the frequency domain resource corresponding to one symbol group may be determined by using the frequency hopping pattern.

The network device usually configures different frequency hopping patterns for different terminal devices, where the different frequency hopping patterns do not overlap. If a terminal device A and a terminal device B perform two repeated transmissions of the PRACH preamble on a same time-frequency resource, that is, the terminal device A and the terminal device B transmit eight symbol groups on the same time-frequency resource, a frequency domain resource corresponding to each symbol group is one of the 12 subcarriers. Frequency hopping patterns of the terminal device A and the terminal device B do not overlap. In other words, a corresponding frequency domain resource used by the terminal device A for any one of the eight symbol groups is different from that used by the terminal device B. For example, respective numbers of subcarriers for the terminal device A to transmit the eight symbol groups are {3, 4, 10, 9, 7, 8, 2, 1}, and respective numbers of subcarriers for the terminal device B to transmit the eight symbol groups are {7, 8, 3, 4, 6, 7, 10, 9}.

In the foregoing solution, a quantity of non-overlapping frequency hopping patterns is a quantity of subcarriers corresponding to the PRACH. In other words, 12 non-overlapping frequency hopping patterns can be supported.

To improve resource utilization efficiency of PRACH transmission, the terminal device may randomly select one frequency hopping pattern from the 12 frequency hopping patterns, and transmit the PRACH preamble based on the frequency hopping pattern, which is different from configuring different frequency hopping patterns for different terminal devices by the network device described above. After detecting the frequency hopping pattern, the network device may notify the terminal device that selects the frequency hopping pattern to send an ID of the terminal device, to complete access of the terminal device.

In the above case, when many terminal devices send preambles at the same time, a conflict probability is high due to random selection of frequency hopping patterns, that is, a probability that at least two terminal devices select a same frequency hopping pattern for sending the preamble is high. For example, a quantity of subcarriers is 12. When four terminal devices send preambles at the same time, a conflict probability is up to 42.7% as $1-12/12\times11/12\times10/12\times9/12=42.7\%$. If two terminal devices choose a same frequency hopping pattern, the network device cannot distinguish between the two terminal devices on a receiving side and thus cannot complete access of the two terminal devices.

In embodiments of this application, a·b, ab, or a×b represents multiplication of two numbers, and a mod b represents a modulo operation.

Figure 4:
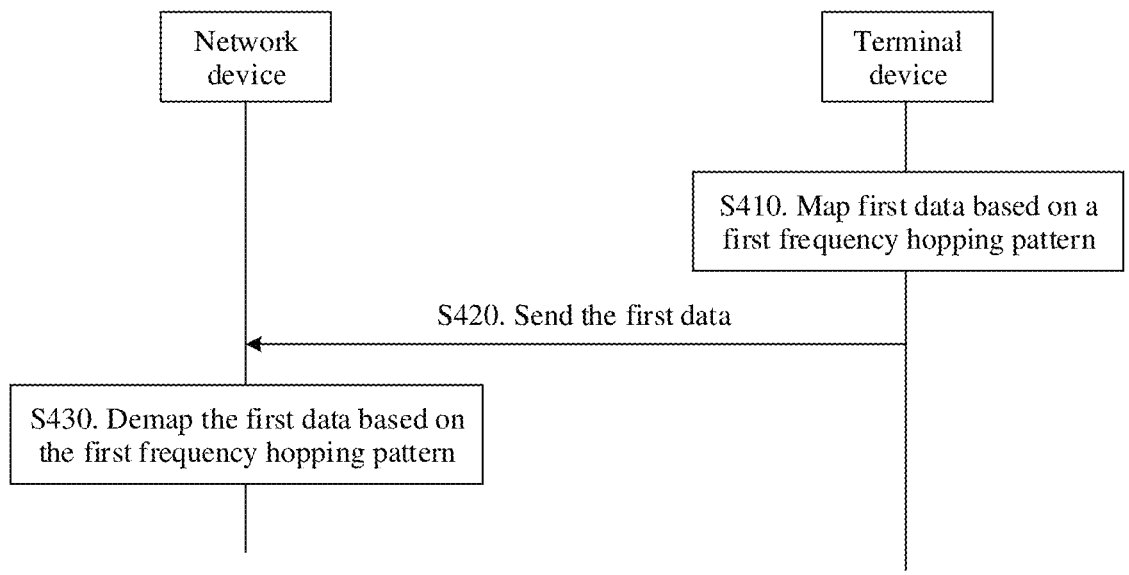
FIG. 4 is a schematic flowchart of a communication method according to an embodiment of this application.

FIG. 4 is a schematic diagram of a communication method 400 according to an embodiment of this application. The method 400 includes step 410 to step 430. Step 410 to step 430 are described in detail below.

410: A terminal device or a network device maps first data based on a first frequency hopping pattern, where the first frequency hopping pattern is one of K candidate frequency hopping patterns, one candidate frequency hopping pattern in the K candidate frequency hopping patterns includes L frequency hopping units, at least two candidate frequency hopping patterns in the K candidate frequency hopping patterns include a same frequency hopping unit, K is an integer greater than 1, and L is an integer greater than 1.

It may alternatively be understood that at least two candidate frequency hopping patterns in the K candidate frequency hopping patterns overlap. A resource used to map the first data is determined by using a frequency hopping unit in the first frequency hopping pattern. The resource may include one or more of a time domain resource, a frequency domain resource, or a code domain resource.

L may be equal to a quantity of time domain resource units included in a time domain resource that can be used to map the first data. In a possible implementation of the frequency hopping unit, one frequency hopping unit includes one frequency domain resource unit in frequency domain and includes one time domain resource unit in time domain. The implementation is described in detail in Form 1 below.

Frequency domain resource units used to map the first data may be the same or different in different time domain resource units.

In a possible implementation of the frequency hopping unit, one frequency hopping unit includes one frequency domain resource unit in frequency domain, includes one time domain resource unit in time domain, and includes one code domain resource unit in code domain. The implementation is described in detail in Form 2 below.

Frequency domain resource units used to map the first data may be the same or different in different time domain resource units. Code domain resource units used to map the first data may be the same or different in different time domain resource units.

In a possible implementation of the frequency hopping unit, one frequency hopping unit includes one frequency domain resource unit in frequency domain, includes one time domain resource unit in time domain, and corresponds to one frequency hopping sub-pattern in the frequency domain resource unit and one frequency hopping sub-pattern in the time domain resource unit. The frequency hopping sub-pattern is one of H candidate frequency hopping sub-patterns, and one of the H candidate frequency hopping sub-patterns includes a plurality of frequency hopping sub-units. H is an integer greater than 1. The implementation is described in detail in Form 3 below.

It may alternatively be understood that one frequency hopping unit corresponds to one frequency domain resource unit in frequency domain and corresponds to one time domain resource unit in time domain. In a time-frequency resource unit including the frequency domain resource unit and the time domain resource unit, one frequency hopping unit corresponds to one frequency hopping sub-pattern in the time-frequency resource unit. In other words, the frequency hopping unit includes a plurality of frequency hopping sub-units in one frequency hopping sub-pattern in the time-frequency resource unit.

Frequency domain resource units used to map the first data may be the same or different in different time domain resource units. Frequency hopping sub-patterns used to map the first data may be the same or different in different time domain resource units. In a time domain resource unit, a resource used to map the first data is determined by using the frequency hopping sub-unit in the frequency hopping sub-pattern.

In a possible implementation of the frequency hopping unit, one frequency hopping unit includes one time domain resource unit in time domain, and the frequency hopping unit corresponds to one frequency hopping sub-pattern in the time domain resource unit. The frequency hopping sub-pattern is one of a plurality of candidate frequency hopping sub-patterns, and one of the plurality of candidate frequency hopping sub-patterns includes a plurality of frequency hopping sub-units.

It may alternatively be understood that one frequency hopping unit corresponds to one time domain resource unit in time domain and corresponds to a frequency domain resource in frequency domain used to map the first data. In a time-frequency resource including the frequency domain resource and the time domain resource unit, one frequency hopping unit corresponds to one frequency hopping sub-pattern in the time-frequency resource. In other words, the frequency hopping unit includes a plurality of frequency hopping sub-units in one frequency hopping sub-pattern in the time-frequency resource.

Frequency hopping sub-patterns used to map the first data may be the same or different in different time domain resource units. In a time domain resource unit, the resource used to map the first data is determined by using the frequency hopping sub-unit in the frequency hopping sub-pattern.

When step 410 is that the terminal device maps the first data based on the first frequency hopping pattern, step 420 is that the terminal device sends the first data to the network device or another terminal device.

When step 410 is that the network device maps the first data based on the first frequency hopping pattern, step 420 is that the network device sends the first data to the terminal device.

When step 410 is that the terminal device maps the first data based on the first frequency hopping pattern, step 430 is that the network device or another terminal device demaps the first data based on the first frequency hopping pattern.

When step 410 is that the network device maps the first data based on the first frequency hopping pattern, step 430 is that the terminal device demaps the first data based on the first frequency hopping pattern.

For example, the network device or the terminal device may detect the first data by using a compressive sensing algorithm.

It should be understood that the method 400 in this embodiment of this application is applicable not only to uplink transmission between the terminal device and the network device, but also to downlink transmission between the network device and the terminal device, as well as transmission between terminal devices. Uplink transmission between the terminal device and the network device is merely used as an example to describe the method 400 in FIG. 4, but is not intended to limit this embodiment of this application.

According to the solution of this embodiment of this application, at least two candidate frequency hopping patterns in the K candidate frequency hopping patterns include a same frequency hopping unit, that is, overlap is allowed between the K candidate frequency hopping patterns. The terminal device or the network device can select one frequency hopping pattern from the K candidate frequency hopping patterns to map the first data. This increases a quantity of candidate frequency hopping patterns that can be supported by the terminal device and the network device, and reduces a probability of a conflict between terminal devices or network devices during signal transmission, thereby increasing an access capacity. For example, during preamble transmission, a probability of a conflict that occurs due to random selection of the candidate frequency hopping pattern can be reduced, thereby increasing a probability of successful access of the terminal device, and increasing a quantity of terminal devices that gain access at the same time.

The frequency hopping unit may include various forms. The following describes three forms (a form 1, a form 2, and a form 3) of the frequency hopping unit, which should not be considered as a limitation on this application.

Form 1: In a possible implementation of the frequency hopping unit, one frequency hopping unit includes one frequency domain resource unit in frequency domain and includes one time domain resource unit in time domain.

Form 2: In a possible implementation of the frequency hopping unit, one frequency hopping unit includes one frequency domain resource unit in frequency domain, includes one time domain resource unit in time domain, and includes one code domain resource unit in code domain.

Form 3: In a possible implementation of the frequency hopping unit, one frequency hopping unit includes one frequency domain resource unit in frequency domain, includes one time domain resource unit in time domain, and corresponds to one frequency hopping sub-pattern in the frequency domain resource unit and one frequency hopping sub-pattern in the time domain resource unit. The frequency hopping sub-pattern is one of H candidate frequency hopping sub-patterns, and one of the H candidate frequency hopping sub-patterns includes a plurality of frequency hopping sub-units. H is an integer greater than 1.

The three forms of the frequency hopping unit are described in detail below.

Form 1

One frequency hopping unit includes one frequency domain resource unit in frequency domain and includes one time domain resource unit in time domain.

Alternatively, it may be understood that the candidate frequency hopping pattern may be used to determine frequency domain resource units corresponding to different time domain resource units.

Specifically, the frequency domain resource that can be used to map the first data may include M frequency domain resource units. The frequency domain resource units included in the frequency domain resource that can be used to map the first data may be understood as candidate frequency domain resource units. A frequency domain resource unit corresponding to one frequency hopping unit is one of the foregoing M frequency domain resource units. One candidate frequency hopping pattern may include L frequency hopping units. L may be equal to a quantity of time domain resource units included in the time domain resource that can be used to map the first data. The terminal device or the network device maps the first data to a time-frequency resource corresponding to the first frequency hopping pattern. The first frequency hopping pattern is one of a plurality of candidate frequency hopping patterns. One candidate frequency hopping pattern is used to determine a frequency domain resource unit corresponding to each time domain resource unit in L time domain resource units.

For example, one time domain resource unit may include at least one frame, at least one subframe, at least one slot, at least one mini-slot, at least one time domain symbol, or the like. This is not limited in this embodiment of this application.

For example, one frequency domain resource unit may include at least one carrier, at least one component carrier, at least one bandwidth part, at least one resource block group, at least one physical resource block group, at least one resource block, at least one subcarrier, or the like. This is not limited in this embodiment of this application.

As described above, one time domain resource unit may include a plurality of time domain symbols. For example, the plurality of time domain symbols may correspond to one physical random access channel (PRACH) symbol group.

As an example, when one time domain resource unit is one PRACH symbol group and one frequency domain resource unit is one subcarrier, the candidate frequency hopping pattern is used to determine subcarriers corresponding to different PRACH symbol groups.

The following describes the frequency hopping pattern by using an example in which one time domain resource unit is one PRACH symbol group, one frequency domain resource unit is one subcarrier, and the first data is a PRACH preamble.

For example, a time domain resource for one transmission of the PRACH preamble may include four PRACH symbol groups. L may be equal to a quantity of PRACH symbol groups, that is, L is 4. In other words, one candidate frequency hopping pattern includes four frequency hopping units. The candidate frequency hopping pattern is used to determine subcarriers transmitted in each of the four PRACH symbol groups.

For another example, a time domain resource for one transmission of the PRACH preamble may include four PRACH symbol groups, and two repeated transmissions of the PRACH preamble require eight PRACH symbol groups. In other words, time domain resources for two transmissions of the PRACH preamble include eight PRACH symbol groups. In this case, L may be equal to a quantity of time domain resource units included in the eight PRACH symbol groups, that is, L is 8. One candidate frequency hopping pattern includes eight frequency hopping units. The candidate frequency hopping pattern is used to determine subcarriers transmitted in each of the eight PRACH symbol groups.

As an example, when one time domain resource unit is one slot and one frequency domain resource unit is one subcarrier, the candidate frequency hopping pattern is used to determine subcarriers transmitted in different slots.

The following describes the frequency hopping pattern by using an example in which one time domain resource unit is one slot, one frequency domain resource unit is one subcarrier, and the first data is a PRACH preamble.

For example, a time domain resource for one transmission of the PRACH preamble may include one slot, and time domain resources for four repeated transmissions of the PRACH preamble include four slots. In this case, L may be equal to a quantity of time domain resource units included in the four slots, that is, a quantity of repeated transmissions of the PRACH preamble. In other words, L is 4. One candidate frequency hopping pattern includes four frequency hopping units. A time-frequency resource for one transmission of the PRACH preamble is one frequency hopping unit. The candidate frequency hopping pattern is used to determine subcarriers transmitted in each of the four slots.

When a time resource unit corresponding to the frequency hopping unit can transmit one complete signal, the frequency hopping unit can ensure that the network device or the terminal device can detect whether a signal is transmitted, to detect the terminal device or the network device. For example, when one time domain resource unit is one slot and the first data is a PRACH preamble, the slot can transmit a complete PRACH preamble, so that the network device can detect whether a signal of the terminal device is transmitted, to detect the terminal device.

In some embodiments an index of the frequency domain resource unit may be preset.

Specifically, a location of the frequency hopping unit in the time-frequency resource that can be used to transmit the first data can be determined by determining an index of a frequency domain resource unit and an index of a time domain resource unit of one frequency hopping unit. Further, locations of the L frequency hopping units in the time-frequency resource can be determined by determining indexes of frequency domain resource units and indexes of time domain resource units in L frequency hopping units in one candidate frequency hopping pattern. For convenience of description, the location of the frequency hopping unit in the time-frequency resource that can be used to transmit the first data may also be referred to as the location of the frequency hopping unit.

The preset index of the frequency domain resource unit may alternatively be understood as a preset correspondence between the index of the frequency domain resource unit of the frequency hopping unit and the index of the time domain resource unit of the frequency hopping unit.

For example, the index of the frequency domain resource unit may be obtained through a predefined table. In other words, the candidate frequency hopping pattern is obtained through the predefined table. Table 1 shows a predefined table for one candidate frequency hopping pattern. It should be understood that Table 1 is merely an example. The correspondence between the index of the frequency domain resource unit and the index of the time domain resource unit is not limited in this embodiment of this application. Specifically, the predefined table may provide locations of L frequency hopping units in one candidate frequency hopping pattern, that is, provide locations of frequency domain resource units and time domain resource units corresponding to the L frequency hopping units; or provide indexes of the frequency domain resource units and indexes of the time domain resource units corresponding to the L frequency hopping units. In other words, that the candidate frequency hopping pattern is obtained through the predefined table may be understood as follows: The predefined table provides a frequency domain resource unit corresponding to each time domain resource unit, or provides an index of the frequency domain resource unit corresponding to each time domain resource unit.

TABLE 1

| Index of a time domain resource unit | 0 | 1 | 2 | ... | L − 1 |
|---|---|---|---|---|---|
| Index of a frequency domain resource unit | 3 | 1 | 7 | ... | 6 |

Alternatively, the index of the frequency domain resource unit may be obtained through calculation according to a specific rule.

In some embodiments the index of the frequency domain resource unit is related to L.

In some embodiments the index of the frequency domain resource unit is further related to M.

In some embodiments the index of the frequency domain resource unit meets:

$$\Sigma_{l=0}^{L-1}((m_{k,l}-l) \bmod M) \times M^l = (\Sigma_{i=0}^{P} c((k+1) \times \theta + i) \times 2^i) \bmod M^L$$

where $m_{k,l}$ is the index of the frequency domain resource unit, $m_{k,l}$ is an integer less than or equal to M−1, M represents a quantity of candidate frequency domain resource units included in the frequency domain resource used to map the first data, the frequency domain resource unit is one of the candidate frequency domain resource units, k represents an index of the candidate frequency hopping pattern, k is an integer less than or equal to K−1, l represents the index of the time domain resource unit, l is an integer less than or equal to L−1, c(n) represents a Gold sequence (Gold sequence), p represents a parameter related to a length of the Gold sequence, and θ represents a related parameter.

In some embodiments the length of the Gold sequence may be $2^p$·p may be a length of a shift register that generates the Gold sequence.

An initialization value $c_{init}$ of the Gold sequence may be predefined or may be configured by the network device for the terminal device. θ may be predefined or may be configured by the network device for the terminal device.

Further, one time domain resource unit may include N OFDM symbols, and indexes of the OFDM symbols may be from 0 to N−1.

As described above, an index of a frequency domain resource unit corresponding to an $l^{th}$ time domain resource unit determined based on a $k^{th}$ candidate frequency hopping pattern is a frequency domain resource unit $m_{k,l}$. In other words, a frequency domain resource unit corresponding to each OFDM symbol in the $l^{th}$ time domain resource unit in the $k^{th}$ candidate frequency hopping pattern is the frequency domain resource unit $m_{k,l}$. x(n) is mapped on an $n^{th}$ OFDM symbol in the $l^{th}$ time domain resource unit, and then the OFDM symbol is generated.

The sequence x(n) may be a predefined sequence.

Further, the sequence x(n) may be a complex sequence.

For example, x(n)=exp(j×π×φ(n)/4), where n is an index of a symbol in the time domain resource unit, n is an integer less than or equal to N−1, j is an imaginary unit, a square of j is equal to −1, π represents the ratio of circumference to diameter, and φ(n) may be specified or preset by a protocol.

All frequency hopping units in the K candidate frequency hopping patterns may include a same code domain resource unit in code domain. The code domain resource unit may be a sequence.

For example, all the frequency hopping units in the K candidate frequency hopping patterns may be a same sequence in code domain. The following describes the index of the frequency domain resource unit by using an example in which one time domain resource unit is one slot, one frequency domain resource unit is one subcarrier, and the first data is a PRACH preamble.

As an example, a time domain resource for one transmission of the PRACH preamble may include one slot, and a frequency domain resource for one transmission of the PRACH preamble may include one subcarrier. The PRACH preamble is repeatedly sent in time domain for L times, where one frequency hopping unit is used for each transmission. In other words, a time domain resource for one transmission includes one slot, and a frequency domain resource for one transmission includes one subcarrier. Time domain resources for L repeated transmissions of the PRACH preamble include L slots. L may be 4, that is, one candidate frequency hopping pattern includes four frequency hopping units. The candidate frequency hopping pattern is used to determine corresponding subcarriers in each of the four slots. The frequency domain resource that can be used to transmit the PRACH preamble includes 12 subcarriers, that is, M is 12. The terminal device may select one candidate frequency hopping pattern from the K candidate frequency hopping patterns to transmit the PRACH preamble. Indexes of the subcarriers are from 0 to 11, indexes of the slots are from 0 to 3, and indexes of the candidate frequency hopping patterns are from 0 to K−1. A subcarrier transmitted in the $l^{th}$ slot determined based on the $k^{th}$ candidate frequency hopping pattern is the subcarrier $m_{k,l}$. An index n of the subcarrier meets:

$$f(k,\theta)=(\Sigma_{i=0}^{31}c((k+1)\times\theta+i)\times 2^i)\bmod 12^4,$$

$$f(k,\theta)=\Sigma_{i=0}^{3}((m_{k,i}-l)\bmod 12)\times 12^l,$$

where a function $f(k,\theta)$ is a pseudorandom function related to k, and the length of the shift register that generates the Gold sequence is 31.

Further, one slot may include N OFDM symbols, where N may be 14. Indexes of the OFDM symbols may be from 0 to N−1.

As described above, the subcarrier transmitted in the $l^{th}$ slot determined based on the $k^{th}$ candidate frequency hopping pattern is the subcarrier $m_{k,l}$. In other words, a subcarrier used to transmit the PRACH preamble in each OFDM symbol in the $l^{th}$ slot is the subcarrier $m_{k,l}$. x(n) is mapped on an $n^{th}$ OFDM symbol in the $l^{th}$ slot, and then the OFDM symbol is generated.

The sequence x(n) may be a predefined sequence.

Further, the sequence x(n) may be a complex sequence.

For example, x(n)=exp(j×π×φ(n)/4), where j is an imaginary unit, a square of j is equal to −1, and π represents the ratio of circumference to diameter.

φ(n) may be specified or preset by a protocol.

For example, φ(n) may be shown in Table 2.

TABLE 2

| φ(0), . . . , φ(13) | | | | | | | | | | | | | |
|---|---|---|---|---|---|---|---|---|---|---|---|---|---|
| −3 | −1 | −1 | 1 | 3 | 1 | 1 | −1 | 1 | −1 | −3 | 1 | 3 | −1 |

Frequency hopping units in the K candidate frequency hopping patterns may all be a same sequence in code domain, and a length of the sequence may be 14.

When the frequency domain resource that can be used to transmit the PRACH preamble includes 12 subcarriers, a quantity of candidate frequency hopping patterns in other approaches is 12. In this embodiment of this application, K may be greater than 12. For example, K may be 24. One terminal device may randomly select one candidate frequency hopping pattern from the 24 candidate frequency hopping patterns to send the PRACH preamble.

When K is 24, if four terminal devices send PRACH preambles at the same time, s frequency hopping patterns are randomly selected from the 24 generated candidate frequency hopping patterns, where s=4. One terminal device needs to determine four frequency hopping units based on the candidate frequency hopping patterns, that is, determine subcarriers corresponding to four slots. The four terminal devices need to determine 16 subcarriers in total, that is, $\{S_{UE1}^{slot1}, S_{UE2}^{slot1}, S_{UE3}^{slot1}, S_{UE4}^{slot1}, S_{UE1}^{slot2}, S_{UE2}^{slot2}, S_{UE3}^{slot2}, S_{UE4}^{slot2}, S_{UE1}^{slot3}, S_{UE2}^{slot3}, S_{UE3}^{slot3}, S_{UE4}^{slot3}, S_{UE1}^{slot4}, S_{UE2}^{slot4}, S_{UE3}^{slot4}, S_{UE4}^{slot4}\}$.

$S_{UE1}^{slot1}$ represents a corresponding subcarrier in a slot 1 determined based on a candidate frequency hopping pattern selected by a UE 1. It should be understood that this expression is described by merely using an example that the terminal device is a UE, and should not be considered as a limitation on this embodiment of this application. Because the foregoing four candidate frequency hopping patterns may overlap, for example, $S_{UE1}^{slot1}=S_{UE2}^{slot1}$, $S_{UE3}^{slot2}=S_{UE4}^{slot2}$, or $S_{UE1}^{slot4}=S_{UE2}^{slot4}$, a quantity of overlapping subcarriers determined based on the four candidate frequency hopping patterns is 3, that is, the four candidate frequency hopping patterns include three identical frequency hopping units. A quantity of non-overlapping subcarriers determined based on the four candidate frequency hopping patterns is 13, that is, the four candidate frequency hopping patterns include 13 different frequency hopping units. According to a criterion 13=(1−ε)×L×s of a Bloom filter, a coefficient ε=3/16 corresponding to the Bloom filter is obtained. For a receiver of the network device, a larger quantity of non-overlapping subcarriers in the four candidate frequency hopping patterns, namely, a larger quantity of different frequency hopping units in the four candidate frequency hopping patterns indicates a higher probability that the network device can identify the foregoing four terminal devices by using a compressive sensing-based detection algorithm. In other words, a smaller coefficient ε corresponding to the Bloom filter indicates better detection performance of the network device based on the compressive sensing-based detection algorithm. For example, let K=24 and θ=23963. Then 24 candidate frequency hopping patterns are generated based on the method for calculating the subcarrier index. Four candidate frequency hopping patterns are randomly selected from the generated 24 candidate frequency hopping patterns based on a simulation result. A probability P that the four candidate frequency hopping patterns include 13 different frequency hopping units is greater than 96%.

Figure 5:
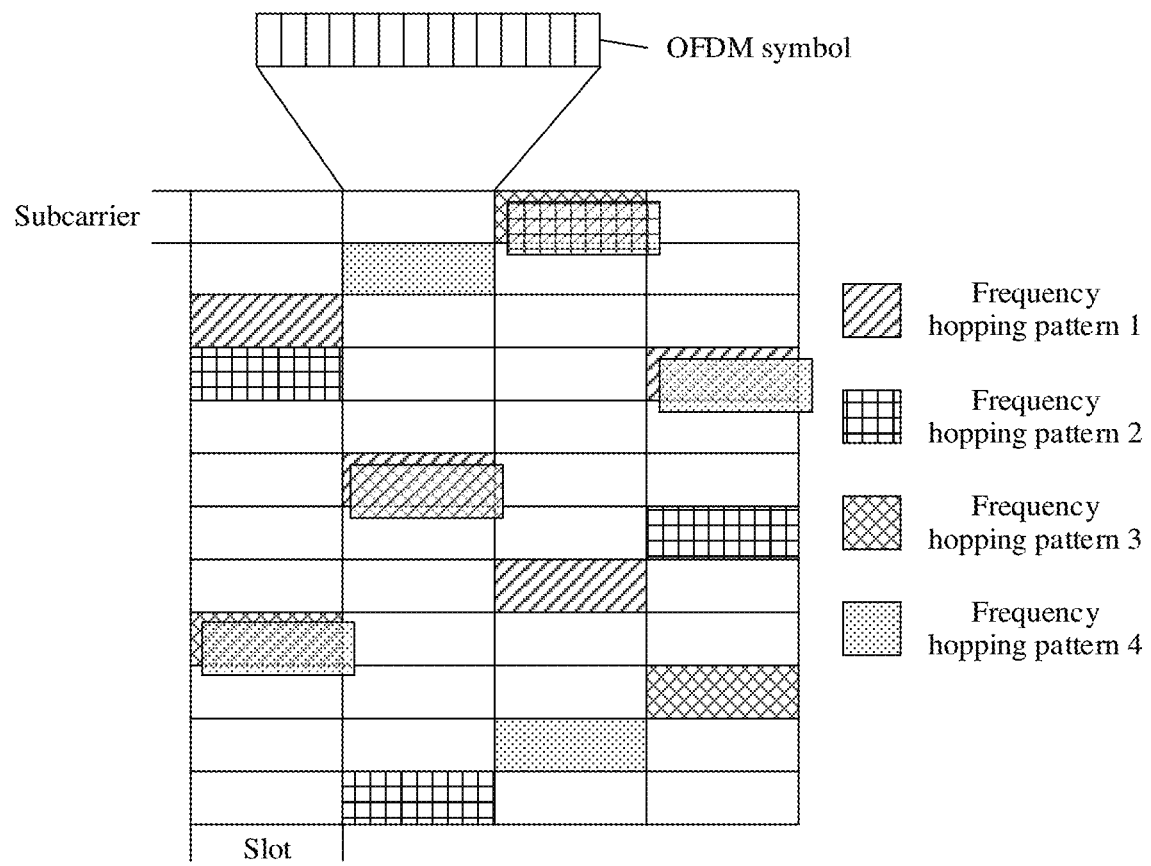
FIG. 5 is a schematic diagram of a frequency hopping pattern according to an embodiment of this application.

FIG. 5 is a schematic diagram of four candidate frequency hopping patterns in the K candidate frequency hopping patterns according to an embodiment of this application. FIG. 5 shows subcarriers that are transmitted in four slots and that are determined based on the four candidate frequency hopping patterns. It should be noted that the candidate frequency hopping patterns in FIG. 5 are described by merely using an example in which one time domain resource unit is one slot and one frequency domain resource unit is one subcarrier. This does not limit the solution of this embodiment of this application. The four candidate frequency hopping patterns shown in FIG. 5 include a same frequency hopping unit, that is, overlap exists among the four candidate frequency hopping patterns. In FIG. 5, indexes of the subcarriers from the bottom to the top are from 0 to 11, and indexes of the slots from the left to the right are from 0 to 3. A frequency hopping pattern 1 and a frequency hopping pattern 3 include a same frequency hopping unit: the frequency hopping unit corresponding to a slot 1 and a subcarrier 6. A frequency hopping pattern 2 and the frequency hopping pattern 3 include a same frequency hopping unit: the frequency hopping unit corresponding to a slot 2 and a subcarrier 11. When the four terminal devices select the four frequency hopping patterns shown in FIG. 5 respectively, although the different frequency hopping patterns partially overlap, there is a relatively high probability that the network device can distinguish between the four terminal devices by using the compressive sensing-based detection algorithm.

The solution of this embodiment of this application allows the candidate frequency hopping patterns to include a same frequency hopping unit, that is, the candidate frequency hopping patterns partial overlap. This can greatly increase a quantity of candidate frequency hopping patterns. In addition, the foregoing manner of generating the candidate frequency hopping pattern can control an overlap degree of frequency hopping patterns, that is, control a design coefficient of the Bloom filter, so that the network device side or the terminal device side can detect the first data by using the compressive sensing algorithm, thereby improving detection accuracy.

Form 2

One frequency hopping unit includes one frequency domain resource unit in frequency domain, includes one time domain resource unit in time domain, and includes one code domain resource unit in code domain. The code domain resource unit is one of V candidate code domain resource units, where V is an integer greater than 1.

Alternatively, it may be understood that the candidate frequency hopping pattern may be used to determine frequency domain resource units corresponding to different time domain resource units, and determine code domain resource units corresponding to different time domain resource units. Different frequency hopping units in the K candidate frequency hopping patterns may correspond to different code domain resource units in code domain.

The first data may include one or more code domain resource units. For example, the first data may include one of the code domain resource units. In other words, the first data is one of the V candidate code domain resource units. Corresponding first data in different time domain resource units may be the same or different. The terminal device or the network device may map, based on the candidate frequency hopping patterns, the first data corresponding to each of the L frequency hopping units to a time domain resource unit and a frequency domain resource unit corresponding to the frequency hopping unit. For another example, the first data may include L code domain resource units in the L frequency hopping units, and the L code domain resource units may be the same or different. The terminal device or the network device may map, based on the candidate frequency hopping patterns, the L code domain resource units in the first data to time domain resource units and frequency domain resource units corresponding to the L frequency hopping units respectively.

Specifically, the frequency domain resource that can be used to map the first data may include M frequency domain resource units. The frequency domain resource units included in the frequency domain resource that can be used to map the first data may be understood as candidate frequency domain resource units. A frequency domain resource unit corresponding to one frequency hopping unit is one of the foregoing M frequency domain resource units. One candidate frequency hopping pattern may include L frequency hopping units. L may be equal to a quantity of time domain resource units in a transmission process of the first data. The terminal device or the network device maps the first data to the time-frequency resource corresponding to the first frequency hopping pattern. The first frequency hopping pattern is one of a plurality of candidate frequency hopping patterns. The candidate frequency hopping pattern is used to determine a frequency domain resource unit corresponding to each time domain resource unit in the L time domain resource units, and determine a code domain resource unit corresponding to each time domain resource unit in the L time domain resource units.

Descriptions of the time domain resource unit and the frequency domain resource unit are similar to the descriptions in above-described Form 1. Details are not described herein again.

As an example, one code domain resource unit may be one sequence. The V candidate code domain resource units may be V candidate sequences, and every two of the V candidate sequences may be orthogonal.

As an example, when one time domain resource unit is one PRACH symbol group, one frequency domain resource unit is one subcarrier, and one code domain resource unit is one sequence, the candidate frequency hopping pattern is used to determine subcarriers transmitted in different PRACH symbol groups and determine sequences transmitted in the different PRACH symbol groups.

The following describes the frequency hopping pattern by using an example in which one time domain resource unit is one PRACH symbol group, one frequency domain resource unit is one subcarrier, one code domain resource unit is one sequence, and the first data is a PRACH preamble.

For example, a time domain resource for one transmission of the PRACH preamble may include four PRACH symbol groups, and L may be equal to a quantity of time domain resource units included in the four PRACH symbol groups, that is, L is 4. One candidate frequency hopping pattern includes four frequency hopping units. The candidate frequency hopping pattern is used to determine a subcarrier transmitted in each PRACH symbol group in the four PRACH symbol groups and determine a sequence transmitted in each PRACH symbol group in the four PRACH symbol groups.

For another example, two repeated transmissions of the PRACH preamble require eight PRACH symbol groups. In other words, time domain resources for two transmissions of the PRACH preamble include eight PRACH symbol groups. L may be equal to a quantity of time domain resource units included in the eight PRACH symbol groups, that is, L is 8. In other words, one candidate frequency hopping pattern includes eight frequency hopping units. The candidate frequency hopping pattern is used to determine a subcarrier transmitted in each PRACH symbol group in the eight PRACH symbol groups and determine a sequence transmitted in each PRACH symbol group in the eight PRACH symbol groups.

As an example, when one time domain resource unit is one slot, one frequency domain resource unit is one subcarrier, and one code domain resource unit is one sequence, the candidate frequency hopping pattern is used to determine subcarriers transmitted in different slots and determine sequences transmitted in different slots.

The following describes the frequency hopping pattern by using an example in which one time domain resource unit is one slot, one frequency domain resource unit is one subcarrier, one code domain resource unit is one sequence, and the first data is a PRACH preamble.

For example, a time domain resource for one transmission of the PRACH preamble may include one slot, and time domain resources for four repeated transmissions of the PRACH preamble include four slots. In this case, L may be equal to a quantity of time domain resource units included in the four slots, that is, a quantity of repeated transmissions of the PRACH preamble. In other words, L is 4. One candidate frequency hopping pattern includes four frequency hopping units. The candidate frequency hopping pattern is used to determine subcarriers and sequences transmitted in each of the four slots.

In some embodiments an index of the frequency domain resource unit may be preset, and an index of the code domain resource unit may also be preset.

Specifically, a frequency hopping unit may be determined by determining an index of a frequency domain resource unit in the frequency hopping unit, an index of a time domain resource unit in the frequency hopping unit, and an index of a code domain resource unit in the frequency hopping unit. Further, locations of the L frequency hopping units in the time-frequency resource and the code domain resource may be separately determined by determining indexes of frequency domain resource units, indexes of time domain resource units, and indexes of code domain resources in L frequency hopping units in one candidate frequency hopping pattern.

The preset index of the frequency domain resource unit and the preset index of the code domain resource unit may alternatively be understood as a preset correspondence between the index of the frequency domain resource unit in the frequency hopping unit, the index of the code domain resource unit in the frequency hopping unit, and the index of the time domain resource unit in the frequency hopping unit.

For example, the index of the frequency domain resource unit and the index of the code domain resource unit may be obtained through a predefined table. In other words, the candidate frequency hopping pattern may be obtained through the predefined table. Table 3 shows a predefined table for one candidate frequency hopping pattern. It should be understood that Table 3 is merely an example. The correspondence between the index of the frequency domain resource unit, the index of the time domain resource unit, and the index of the code domain resource unit is not limited in this embodiment of this application. Specifically, the predefined table may provide L frequency hopping units in one candidate frequency hopping pattern, that is, provide locations of frequency domain resource units, time domain resource units, and code domain resource units corresponding to the L frequency hopping units; or provide indexes of the frequency domain resource units, indexes of the time domain resource units, and indexes of the code domain resource units corresponding to the L frequency hopping units. In other words, that the candidate frequency hopping pattern is obtained through the predefined table may be understood as that the predefined table provides a frequency domain resource unit corresponding to each time domain resource unit and a code domain resource unit corresponding to each time domain resource unit; or provides an index of the frequency domain resource unit corresponding to each time domain resource unit and an index of the code domain resource unit corresponding to each time domain resource unit.

TABLE 3

| Index of a time domain resource unit | 0 | 1 | 2 | ... | L − 1 |
|---|---|---|---|---|---|
| Index of a frequency domain resource unit | 3 | 1 | 7 | ... | 6 |
| Index of a code domain resource unit | 0 | 1 | 2 | ... | 1 |

Alternatively, the index of the frequency domain resource unit and the index of the code domain resource unit may be obtained through calculation according to a specific rule.

As an example, determining L frequency hopping units in one candidate frequency hopping pattern may be: first determining an index of a frequency domain resource unit in each frequency hopping unit in the L frequency hopping units, and then determining an index of a code domain resource unit in each frequency hopping unit.

Specifically, the index of the frequency domain resource unit may be determined in the manner shown in Form 1.

As an example, determining L frequency hopping units in one candidate frequency hopping pattern may be: calculating both an index of a frequency domain resource unit and an index of a code domain resource unit in a corresponding time domain resource unit that are corresponding to each frequency hopping unit.

In some embodiments the index of the frequency domain resource unit is related to L and V, and the index of the code domain resource unit is related to L and V.

In some embodiments the index of the frequency domain resource unit is further related to M. The index of the code domain resource unit is further related to M.

In some embodiments the index of the frequency domain resource unit and the index of the code domain resource unit meet:

$$\Sigma_{l=0}^{L-1}(12 \times v_{k,l} + m_{k,l} - l) \bmod(M \times V)) \times (M \times V)^l = (\Sigma_{i=0}^{p} c((k+1) \times \theta + i) \times 2^i) \bmod(M \times V)^L$$

where $m_{k,l}$ is the index of the frequency domain resource unit, $m_{k,l}$ is an integer less than or equal to M−1, M represents the quantity of candidate frequency domain resource units included in the frequency domain resource used to map the first data, the frequency domain resource unit is one of the candidate frequency domain resource units, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, l is an integer less than or equal to L−1, c(n) represents the Gold sequence, p represents the parameter related to the length of the Gold sequence, and θ represents a related parameter.

In some embodiments the length of the Gold sequence may be $2^p$·p may be the length of the shift register that generates the Gold sequence.

The initialization value $c_{init}$ of the Gold sequence may be predefined or may be configured by the network device for the terminal device. θ may be predefined or may be configured by the network device for the terminal device.

The code domain resource unit may be determined by using the index of the code domain resource unit. The code domain resource unit is related to the index of the code domain resource unit and a quantity N of symbols in the time domain resource unit, and N is a positive integer. When the code domain resource unit is a sequence, a length of the sequence is related to the quantity N of symbols in the time domain resource unit.

The sequence may be a predefined sequence.

As described above, an index of a frequency domain resource unit corresponding to the $l^{th}$ time domain resource unit determined based on the $k^{th}$ candidate frequency hopping pattern is the frequency domain resource unit $m_{k,l}$. In other words, a frequency domain resource unit corresponding to each OFDM symbol in the $l^{th}$ time domain resource unit in the $k^{th}$ candidate frequency hopping pattern is the frequency domain resource unit $m_{k,l}$. $x_{v_{k,l}}(n)$ is mapped on the $n^{th}$ OFDM symbol in the $l^{th}$ time domain resource unit, and then the OFDM symbol is generated.

Further, the sequence may be a complex sequence.

In some embodiments the sequence $v_{k,l}$ is $x_{v_{k,l}}(n)$, and the $x_{v_{k,l}}(n)$ meets:

$$x_{v_{k,l}}(n) = \exp(j \times \pi \times (\varphi(n)/4) + 3 \times v_{k,l} \times n/7)$$

where n is an index of the symbol in the time domain resource unit, n is an integer less than or equal to N−1, j is an imaginary unit, $\varphi(n)$ is a preset sequence, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, and l is an integer less than or equal to L−1.

The following describes the manner of determining the index of the frequency domain resource unit and the index of the code domain resource unit by using an example in which one time domain resource unit is one slot, one frequency domain resource unit is one subcarrier, one code domain resource unit is one sequence, and the first data is a PRACH preamble.

As an example, a time domain resource for one transmission of the PRACH preamble may include one slot, and a frequency domain resource for one transmission of the PRACH preamble includes one subcarrier. Time domain resources for four repeated transmissions of the PRACH preamble include four slots, and frequency domain resources for four repeated transmissions of the PRACH preamble include one subcarrier. L is 4, that is, one candidate frequency hopping pattern includes four frequency hopping units. The candidate frequency hopping pattern is used to determine subcarriers and sequences transmitted in each of the four slots. The frequency domain resource that can be used to transmit the PRACH preamble include M subcarriers, and M may be 12. A code domain resource that can be used to transmit the PRACH preamble is four orthogonal sequences, that is, V is 4. The PRACH preamble is repeatedly sent in time domain for L times, where one frequency hopping unit is used for each transmission. In other words, a time domain resource for one transmission includes one slot, a frequency domain resource for one transmission includes one subcarrier, and a code domain resource for one transmission is one sequence. The terminal device may select one candidate frequency hopping pattern from the K candidate frequency hopping patterns to transmit the PRACH preamble. Indexes of the sequences are from 0 to 3, indexes of the subcarriers are from 0 to 11, indexes of the slots are from 0 to 3, and indexes of the candidate frequency hopping patterns are from 0 to K−1. A subcarrier transmitted in the $l^{th}$ slot determined based on the $k^{th}$ candidate frequency hopping pattern is the subcarrier $m_{k,l}$ and a sequence transmitted in the $l^{th}$ slot is a sequence $v_{k,l}$. A frequency hopping unit can be determined by using an index of a slot, an index of a subcarrier, and an index of a sequence. For convenience of description, it may be understood that one candidate frequency hopping pattern corresponds to one two-dimensional array $(m_{k,l}, v_{k,l})$ in one slot.

The index of the subcarrier and the index of the sequence meet:

$$f(k,\theta) = (\Sigma_{i=0}^{31} c((k+1) \times \theta + i) \times 2^i) \bmod 48^4,$$

$$f(k,\theta) = \Sigma_{l=0}^{3}((12 \times v_{k,l} + m_{k,l} - l) \bmod 48) \times 48^l,$$

where a function $f(k,\theta)$ is a pseudorandom function related to k, and the length of the shift register that generates the Gold sequence is 31.

One slot may include N OFDM symbols, where N may be 14. Indexes of the OFDM symbols may be from 0 to N−1.

As described before, the subcarrier transmitted in the $l^{th}$ slot determined based on the $k^{th}$ candidate frequency hopping pattern is the subcarrier $m_{k,l}$, and the sequence transmitted in the $l^{th}$ slot is the sequence $v_{k,l}$. In other words, a subcarrier used to transmit the PRACH preamble in each OFDM symbol in the $l^{th}$ slot is the subcarrier $m_{k,l}$. $x_{v_{k,l}}(n)$ is mapped on the $n^{th}$ OFDM symbol in the $l^{th}$ slot, and then the OFDM symbol is generated.

The sequence $x_{v_{k,l}}(n)$ may be a predefined sequence.

Further, the sequence $x_{v_{k,l}}(n)$ may be a complex sequence.

For example, $x_{v_{k,l}}(n) = \exp(j \times \pi \times (\varphi(n)/4) + 3 \times v_{k,l} \times n/7)$, where j is an imaginary unit, a square of j is equal to −1, and π represents the ratio of circumference to diameter.

$\varphi(n)$ may be specified or preset by a protocol.

For example, $\varphi(n)$ may be shown in Table 2 in above-described Form 1.

When the frequency domain resource used to transmit the PRACH preamble includes 12 subcarriers, a quantity of candidate frequency hopping patterns in the other approaches is 12. However, in this embodiment of this application, a quantity of orthogonal sequences is 4, and therefore, a quantity of candidate frequency hopping patterns may be 48. In addition, overlap is allowed between the candidate frequency hopping patterns in this embodiment of this application, that is, K may be greater than 48.

If four terminal devices send PRACH preambles at the same time, s frequency hopping patterns are randomly selected from the K generated candidate frequency hopping patterns, where s=4. One terminal device needs to determine four frequency hopping units based on the candidate frequency hopping patterns, that is, determine $(m_{k,l}, v_{k,l})$ corresponding to four slots. The four terminal devices need to determine 16 $(m_{k,l}, v_{k,l})$ in total. Similar to Form 1, if the four candidate frequency hopping patterns include three overlapping $(m_{k,l}, v_{k,l})$, the four candidate frequency hopping patterns include three same frequency hopping units. In other words, the four candidate frequency hopping patterns include 13 non-overlapping $(m_{k,l}, v_{k,l})$, that is, the four candidate frequency hopping patterns include 13 different frequency hopping units. According to a criterion 13=(1−ε)× L×s of a Bloom filter, a coefficient ε=3/16 corresponding to the Bloom filter is obtained. For example, let K=48 and θ=23963. Then 48 candidate frequency hopping patterns are generated based on the method for determining the index of the subcarrier and the index of the sequence. Four candidate frequency hopping patterns are randomly selected from the generated 48 candidate frequency hopping patterns based on a simulation result. A probability P that the four candidate frequency hopping patterns include 13 different frequency hopping units is greater than 99%.

Figure 6:
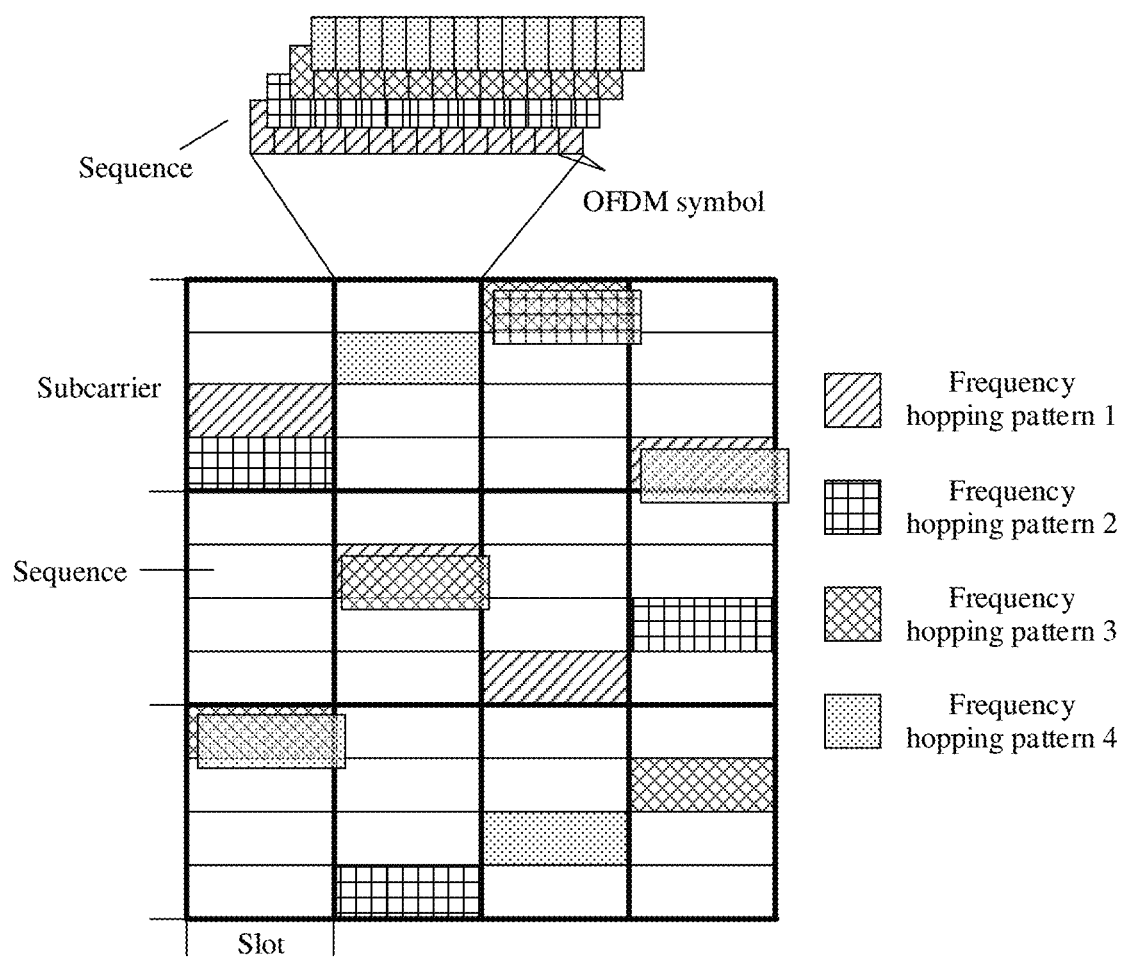
FIG. 6 is a schematic diagram of another frequency hopping pattern according to an embodiment of this application.

FIG. 6 is a schematic diagram of four candidate frequency hopping patterns in the K candidate frequency hopping patterns according to another embodiment of this application. FIG. 6 shows subcarriers and sequences that are transmitted in four slots and that are determined based on the four candidate frequency hopping patterns. It should be noted that the candidate frequency hopping patterns in FIG. 5 are described by merely using an example in which one time domain resource unit is one slot, one frequency domain resource unit is one subcarrier, and one code domain resource unit is one sequence. This does not limit the solution of this embodiment of this application. The four candidate frequency hopping patterns shown in FIG. 6 include a same frequency hopping unit, that is, overlap exists among the four candidate frequency hopping patterns. In FIG. 6, indexes of the subcarriers from the bottom to the top are from 0 to 11, indexes of the slots from the left to the right are from 0 to 3, and indexes of the sequences from the bottom to the top are from 0 to 3. A frequency hopping pattern 1 and a frequency hopping pattern 3 include a same frequency hopping unit: the frequency hopping unit corresponding to a slot 1, a subcarrier 1, and a sequence 2. A frequency hopping pattern 2 and the frequency hopping pattern 3 include a same frequency hopping unit: the frequency hopping unit corresponding to a slot 2, a subcarrier 2, and a sequence 3. It can be learned from FIG. 6 that the frequency hopping pattern 1 and the frequency hopping pattern 2 do not include a same frequency hopping unit, and subcarriers transmitted in a slot 0 and determined based on the frequency hopping pattern 1 and the frequency hopping pattern 2 are both a subcarrier 2. Sequences transmitted in the slot 0 and determined based on the frequency hopping pattern 1 and the frequency hopping pattern 2 are different, and therefore, the frequency hopping pattern 1 and the frequency hopping pattern 2 do not overlap on the subcarrier 2 in the slot 0, that is, the frequency hopping pattern 1 and the frequency hopping pattern 2 do not include a same frequency hopping unit in the slot 0.

According to the solution of this embodiment of this application, candidate frequency hopping patterns are allowed to include a same frequency hopping unit, that is, candidate frequency hopping patterns partially overlap, thereby increasing a quantity of candidate frequency hopping patterns. In addition, a code domain resource unit, for example, a time domain orthogonal sequence, is introduced to a single frequency domain resource unit, thereby further increasing the quantity of candidate frequency hopping patterns and reducing a conflict probability. In addition, the foregoing manner of generating the candidate frequency hopping pattern can control an overlap degree of frequency hopping patterns, that is, control a design coefficient of the Bloom filter, so that the network device side or the terminal device side can detect an uplink signal by using the compressive sensing algorithm, thereby improving detection accuracy.

Form 3

One frequency hopping unit includes one frequency domain resource unit in frequency domain, includes one time domain resource unit in time domain, and corresponds to one frequency hopping sub-pattern in the frequency domain resource unit and one frequency hopping sub-pattern in the time domain resource unit. The frequency hopping sub-pattern is one of H candidate frequency hopping sub-patterns. One of the H candidate frequency hopping sub-patterns includes Q frequency hopping sub-units, where Q is an integer greater than 1.

Alternatively, it may be understood that the candidate frequency hopping pattern may be used to determine frequency domain resource units corresponding to different time domain resource units and candidate frequency hopping sub-patterns corresponding to different time domain resource units. In a candidate frequency hopping pattern, a correspondence between a time domain resource unit and a frequency domain resource unit may be one of Y candidate correspondences. For ease of understanding, the Y candidate correspondences may be considered as Y candidate intermediate patterns. In other words, the candidate intermediate pattern may be used to determine a correspondence between a time domain resource unit and a frequency domain resource unit in each of the L frequency hopping units. The candidate frequency hopping pattern may be used to determine a candidate intermediate pattern and candidate frequency hopping sub-patterns corresponding to different time domain resource units in the candidate intermediate pattern. Different candidate frequency hopping patterns may correspond to the same or different candidate intermediate patterns.

Descriptions of the time domain resource unit and the frequency domain resource unit are similar to the descriptions in above-described Form 1. Details are not described herein again.

One frequency hopping sub-unit includes one frequency domain resource sub-unit in frequency domain and includes one time domain resource sub-unit in time domain.

Alternatively, it may be understood that the candidate frequency hopping sub-pattern may be used to determine frequency domain resource sub-units corresponding to different time domain resource sub-units.

Specifically, the frequency domain resource that can be used to map the first data may include M frequency domain resource units. The frequency domain resource units included in the frequency domain resource that can be used to map the first data may be understood as candidate frequency domain resource units. A frequency domain resource unit corresponding to one frequency hopping unit is one of the M frequency domain resource units. One candidate frequency hopping pattern may include L frequency hopping units. L may be equal to a quantity of time domain resource units in a transmission process of the first data. The terminal device or the network device maps the first data to the time-frequency resource corresponding to the first frequency hopping pattern. The first frequency hopping pattern is one of a plurality of candidate frequency hopping patterns. The candidate frequency hopping pattern is used to determine a frequency domain resource unit corresponding to each time domain resource unit in the L time domain resource units, and determine a candidate frequency hopping sub-pattern corresponding to each time domain resource unit in the L time domain resource units. A length of one time domain resource sub-unit is less than a length of one time-frequency resource unit. One time domain resource sub-unit may include at least one frame, at least one subframe, at least one slot, at least one mini-slot, at least one time domain symbol, or the like, provided that the length of the time domain resource sub-unit is less than the length of the time domain resource unit. This embodiment of this application imposes no limitation on a form of the time domain resource sub-unit.

Q may be equal to a quantity of time domain resource sub-units included in one time domain resource unit.

A frequency domain range of one frequency domain resource sub-unit is less than a frequency domain range of one frequency domain resource unit. One frequency domain resource sub-unit may include at least one carrier, at least one component carrier, at least one bandwidth part, at least one resource block group, at least one physical resource block group, at least one resource block, or at least one subcarrier, provided that the frequency domain range of one frequency domain resource sub-unit is less than the frequency domain range of one frequency domain resource unit. This embodiment of this application imposes no limitation on a form of the frequency domain resource sub-unit.

As described above, one frequency domain resource unit may include a plurality of subcarriers, for example, one subcarrier group.

As an example, when one time domain resource unit is one slot and one frequency domain resource unit is one subcarrier group, the candidate frequency hopping pattern is used to determine subcarrier groups corresponding to different slots and frequency hopping sub-patterns corresponding to different slots.

The following describes the frequency hopping pattern by using an example in which one time domain resource unit is one slot, one frequency domain resource unit is one subcarrier group, and the first data is a PRACH preamble.

As an example, a time domain resource for one transmission of the PRACH preamble may include one slot, and a frequency domain resource for one transmission of the PRACH preamble includes one subcarrier. Time domain resources for four repeated transmissions of the PRACH preamble include four slots, and frequency domain resources for four repeated transmissions of the PRACH preamble include one subcarrier. In this case, L is a quantity of repeated transmissions of the PRACH preamble, where L is 4, that is, one candidate frequency hopping pattern includes four frequency hopping units. The candidate frequency hopping pattern is used to determine corresponding subcarrier groups and candidate frequency hopping sub-patterns in each of the four slots. One slot may include N OFDM symbols. When one time domain resource sub-unit is one OFDM symbol and one frequency domain resource sub-unit is one subcarrier, the candidate frequency hopping sub-pattern is used to determine corresponding subcarriers on each of the N OFDM symbols. Alternatively, it may be understood that subcarriers corresponding to different OFDM symbols may be different.

In some embodiments indexes of the frequency domain resources may be preset, and an index of the candidate frequency hopping sub-pattern may be preset.

Specifically, a frequency hopping unit may be determined by determining an index of a frequency domain resource unit in the frequency hopping unit, an index of a time domain resource unit in the frequency hopping unit, and an index of a candidate frequency hopping sub-pattern in the frequency hopping unit. Further, locations of the L frequency hopping units in the time-frequency resource can be separately determined by determining indexes of frequency domain resource units, indexes of time domain resource units, and indexes of candidate frequency hopping sub-patterns in L frequency hopping units in one candidate frequency hopping pattern.

The preset index of the frequency domain resource unit and the preset index of the candidate frequency hopping sub-pattern may alternatively be understood as a preset correspondence between the index of the frequency domain resource unit in the frequency hopping unit, the index of the candidate frequency hopping sub-pattern in the frequency hopping unit, and the index of the time domain resource unit in the frequency hopping unit. As mentioned above, the candidate intermediate pattern may be used to determine a correspondence between a frequency domain resource unit and a time domain resource unit in each of the L frequency hopping units. Therefore, the preset index of the frequency domain resource unit may alternatively be understood as the preset candidate intermediate pattern.

For example, the index of the frequency domain resource unit and the index of the candidate frequency hopping sub-pattern may be obtained through a predefined table. In other words, the candidate frequency hopping pattern may be obtained through the predefined table. Table 4 shows a predefined table for one candidate frequency hopping pattern. The first two rows in Table 4 show a candidate intermediate pattern corresponding to the candidate frequency hopping pattern. It should be understood that Table 4 is merely an example. The correspondence between the index of the frequency domain resource unit, the index of the time domain resource unit, and the index of the candidate frequency hopping sub-pattern is not limited in this embodiment of this application. Specifically, the predefined table may provide the L frequency hopping units in the candidate frequency hopping pattern, that is, provide locations of frequency domain resource units and locations of time domain resource units that are corresponding to the L frequency hopping units, and candidate frequency hopping sub-patterns at locations of time-frequency resource units corresponding to the L frequency hopping units; or provide indexes of the frequency domain resource units, indexes of the time domain resource units, and indexes of the candidate frequency hopping sub-patterns corresponding to the L frequency hopping units. Alternatively, that the candidate frequency hopping pattern is obtained through the predefined table may be understood as follows: The predefined table provides a frequency domain resource unit corresponding to each time domain resource unit and a candidate frequency hopping sub-pattern corresponding to each time domain resource unit; or provides an index of the frequency domain resource unit corresponding to each time domain resource unit and an index of the candidate frequency hopping sub-pattern corresponding to each time domain resource unit.

TABLE 4

| Index of a time domain resource unit | 0 | 1 | 2 | ... | L − 1 |
|---|---|---|---|---|---|
| Index of a frequency domain resource unit | 3 | 1 | 7 | ... | 6 |
| Index of a candidate frequency hopping sub-pattern | 0 | 1 | 2 | ... | 1 |

Alternatively, the index of the frequency domain resource unit and the index of the candidate frequency hopping sub-pattern may be obtained through calculation according to a specific rule. Alternatively, it may be understood that an index of the candidate intermediate pattern and the index of the candidate frequency hopping sub-pattern may be obtained through calculation according to a specific rule.

As an example, determining L frequency hopping units in one candidate frequency hopping pattern may be: first determining a candidate intermediate pattern, that is, first determining an index of a frequency domain resource unit in each frequency hopping unit in the L frequency hopping units, and then determining an index of a candidate frequency hopping sub-pattern in each frequency hopping unit.

Specifically, the index of the frequency domain resource unit in the candidate intermediate pattern may be determined in the manner shown in Form 1.

As an example, determining L frequency hopping units in one candidate frequency hopping pattern may be simultaneously calculating an index of a candidate intermediate pattern and an index of a corresponding candidate frequency hopping sub-pattern in a time domain resource unit in each frequency hopping unit.

In some embodiments the index of the candidate intermediate pattern is related to L and H, and the index of the candidate frequency hopping sub-pattern is related to L and H.

In some embodiments the index of the candidate intermediate pattern is further related to Y. The index of the candidate frequency hopping sub-pattern is further related to Y.

In some embodiments the index of the candidate intermediate pattern and the index of the candidate frequency hopping sub-pattern meet:

$$\Sigma_{l=0}^{L}((12 \times h_{k,l}+y_k-l) \bmod (Y \times H)) \times (H \times Y)^l = (\Sigma_{i=0}^{p} c((k+1) \times \theta+i) \times 2^i) \bmod (H \times Y)^L$$

where $y_k$ represents the index of the candidate intermediate pattern, $y_k$ is an integer less than or equal to Y−1, k represents the index of the candidate frequency hopping pattern, k is an integer less than or equal to K−1, l represents the index of the time domain resource unit, l is an integer less than or equal to L−1, c(n) represents a Gold sequence, p represents a parameter related to a length of the Gold sequence, θ represents a related parameter, $h_{k,l}$ represents the index of the candidate frequency hopping sub-pattern, that is, represents an index of a candidate frequency hopping sub-pattern that is determined by a $k^{th}$ candidate frequency hopping pattern and that is corresponding to an $l^{th}$ time domain resource unit, and $h_{k,l}$ is an integer less than or equal to H−1.

The length of the Gold sequence may be $2^p \cdot p$ may be a length of a shift register that generates the Gold sequence.

An initialization value $c_{init}$ of the Gold sequence may be predefined or may be configured by the network device for the terminal device. θ may be predefined or may be configured by the network device for the terminal device. Further, one time domain resource unit may include N OFDM symbols, and indexes of the OFDM symbols may be from 0 to N−1.

As described above, a candidate intermediate pattern determined by using the $k^{th}$ candidate frequency hopping pattern is a candidate intermediate pattern $y_k$, and a frequency domain resource unit corresponding to an $l^{th}$ time domain resource unit in the candidate intermediate pattern $y_k$ is a frequency domain resource unit $m_{k,l}$. In this frequency domain resource unit, a frequency domain resource corresponding to each OFDM symbol may be determined by using the candidate frequency hopping sub-pattern. x(n) is mapped on an $n^{th}$ OFDM symbol in the $l^{th}$ time domain resource unit, and then the OFDM symbol is generated.

The sequence x(n) may be a predefined sequence.

Further, the sequence x(n) may be a complex sequence.

For example, $x(n)=\exp(j \times \pi \times \varphi(n)/4)$, where n is an index of a symbol in the time domain resource unit, n is an integer less than or equal to N−1, j is an imaginary unit, a square of j is equal to −1, π represents the ratio of circumference to diameter, and P(n) may be specified or preset by a protocol.

All frequency hopping units in the K candidate frequency hopping patterns may include a same code domain resource unit in code domain. The code domain resource unit may be a sequence.

For example, all frequency hopping units in the K candidate frequency hopping patterns may be a same sequence in code domain.

The following describes the index of the frequency domain resource unit and the index of the candidate frequency hopping sub-pattern by using an example in which one time domain resource unit is one slot, one frequency domain resource unit is one subcarrier group including four subcarriers, four candidate frequency hopping sub-patterns exist, and the first data is a PRACH preamble.

As an example, a time domain resource for one transmission of the PRACH preamble may include one slot, and a frequency domain resource for one transmission of the PRACH preamble includes one subcarrier. Time domain resources for four repeated transmissions of the PRACH preamble include four slots, and frequency domain resources for four repeated transmissions of the PRACH preamble include one subcarrier. L is 4, that is, one candidate frequency hopping pattern includes four frequency hopping units. The candidate frequency hopping pattern is used to determine a subcarrier group and a corresponding frequency hopping sub-pattern transmitted in each of the four slots. The frequency domain resource that can be used to transmit the PRACH preamble includes 12 subcarriers, that is, M is 3. The PRACH preamble is repeatedly sent in time domain for L times, where one frequency hopping unit is used for each transmission. In other words, a time domain resource for one transmission includes one slot, and a frequency domain resource for one transmission includes one subcarrier. The terminal device may select one candidate frequency hopping pattern from the K candidate frequency hopping patterns to transmit the PRACH preamble. Indexes of the subcarrier groups are from 0 to 2, indexes of the slots are from 0 to 3, indexes of the candidate frequency hopping patterns are from 0 to K−1, and indexes of the candidate frequency hopping sub-patterns are from 0 to H−1. The candidate intermediate pattern determined by using the $k^{th}$ candidate frequency hopping pattern is the candidate intermediate pattern $y_k$, a candidate frequency hopping sub-pattern corresponding to the $l^{th}$ time domain resource unit is a frequency hopping sub-pattern $h_{k,l}$, and a frequency domain resource unit corresponding to the $l^{th}$ time domain resource unit in the candidate intermediate pattern $y_k$ is the frequency domain resource unit $m_{k,l}$. For convenience of description, it may be understood that one candidate frequency hopping pattern corresponds to one two-dimensional array $(m_{k,l}, h_{k,l})$ in one slot.

The index of the frequency domain resource unit and the index of the candidate frequency hopping sub-pattern meet:

$$f(k,\theta)=(\Sigma_{i=0}^{31} c((k+1) \times \theta+i) \times 2^i) \bmod 36^4,$$

$$f(k,\theta)=\Sigma_{l=0}^{3}((12 \times h_{k,l}+y_k-l) \bmod 36) \times 36^l,$$

where a function $f(k,\theta)$ is a pseudorandom function related to k, and the length of the shift register that generates the Gold sequence is 31.

Further, one slot may include N OFDM symbols, where N may be 14. Indexes of the OFDM symbols may be from 0 to 13. A frequency hopping sub-unit in the candidate frequency hopping sub-pattern includes one time domain resource sub-unit in time domain, and includes one frequency domain resource sub-unit in frequency domain. The time domain resource sub-unit may be one OFDM symbol, and the frequency domain resource sub-unit may be one subcarrier. The candidate frequency hopping sub-pattern may be used to determine subcarriers corresponding to different OFDM symbols.

As described above, the candidate intermediate pattern determined by using the $k^{th}$ candidate frequency hopping pattern is the candidate intermediate pattern $y_k$, the candidate frequency hopping sub-pattern corresponding to the $l^{th}$ time domain resource unit is the frequency hopping sub-pattern $h_{k,l}$, and the frequency domain resource unit corresponding to the $l^{th}$ time domain resource unit in the candidate intermediate pattern $y_k$ is the frequency domain resource unit $m_{k,l}$. Alternatively, it may be understood that a subcarrier that is used to transmit the PRACH preamble and that is in each OFDM symbol in the $l^{th}$ slot is a subcarrier in a subcarrier group $m_{k,l}$. The subcarrier corresponding to each OFDM symbol is determined by using a frequency hopping sub-pattern corresponding to the slot. x(n) is mapped on the $n^{th}$ OFDM symbol in the $l^{th}$ slot, and then the OFDM symbol is generated.

The sequence x(n) may be a predefined sequence.

Further, the sequence x(n) may be a complex sequence.

For example, $x(n)=\exp(j\times\eta\times\varphi(n)/4)$, where j is an imaginary unit, a square of j is equal to −1, and π represents the ratio of circumference to diameter.

φ(n) may be specified or preset by a protocol.

For example, φ(n) may be shown in Table 2 in Form 1.

Frequency hopping units in the K candidate frequency hopping patterns may all be a same sequence in code domain, and a length of the sequence may be 14.

When the frequency domain resource that can be used to transmit the PRACH preamble includes 12 subcarriers, a quantity of candidate frequency hopping patterns in other approaches is 12. However, in this embodiment of this application, a quantity of candidate frequency hopping sub-patterns is 4, the candidate frequency hopping sub-patterns may be orthogonal frequency hopping sub-patterns, and a quantity of subcarrier groups is 3. Because overlap is allowed between the candidate frequency hopping patterns, a quantity Y of candidate intermediate patterns may be 9, and therefore, the quantity of candidate frequency hopping patterns may be 36.

If four terminal devices send PRACH preambles at the same time, s frequency hopping patterns are randomly selected from the K generated candidate frequency hopping patterns, where s=4. One terminal device needs to determine four frequency hopping units based on the candidate frequency hopping patterns, that is, determine $(m_{k,l},h_{k,l})$ corresponding to four slots. The four terminal devices need to determine 16 $(m_{k,l},h_{k,l})$ in total. Similar to Form 1, if the four candidate frequency hopping patterns include three overlapping $(m_k, h_k)$, the four candidate frequency hopping patterns include three same frequency hopping units. In other words, the four candidate frequency hopping patterns include 13 non-overlapping $(m_{k,l},h_{k,l})$, that is, the four candidate frequency hopping patterns include 13 different frequency hopping units. According to a criterion $13=(1-\varepsilon)\times L\times s$ of a Bloom filter, a coefficient $\varepsilon=3/16$ corresponding to the Bloom filter is obtained. For example, let K=48 and θ=23963. Then 36 candidate frequency hopping patterns are generated based on the method for determining the index of the subcarrier group and the index of the candidate frequency hopping sub-pattern. Four candidate frequency hopping patterns are randomly selected from the generated 36 candidate frequency hopping patterns based on a simulation result. A probability P that the four candidate frequency hopping patterns include 13 different frequency hopping units is greater than 98.3%.

Figure 7:
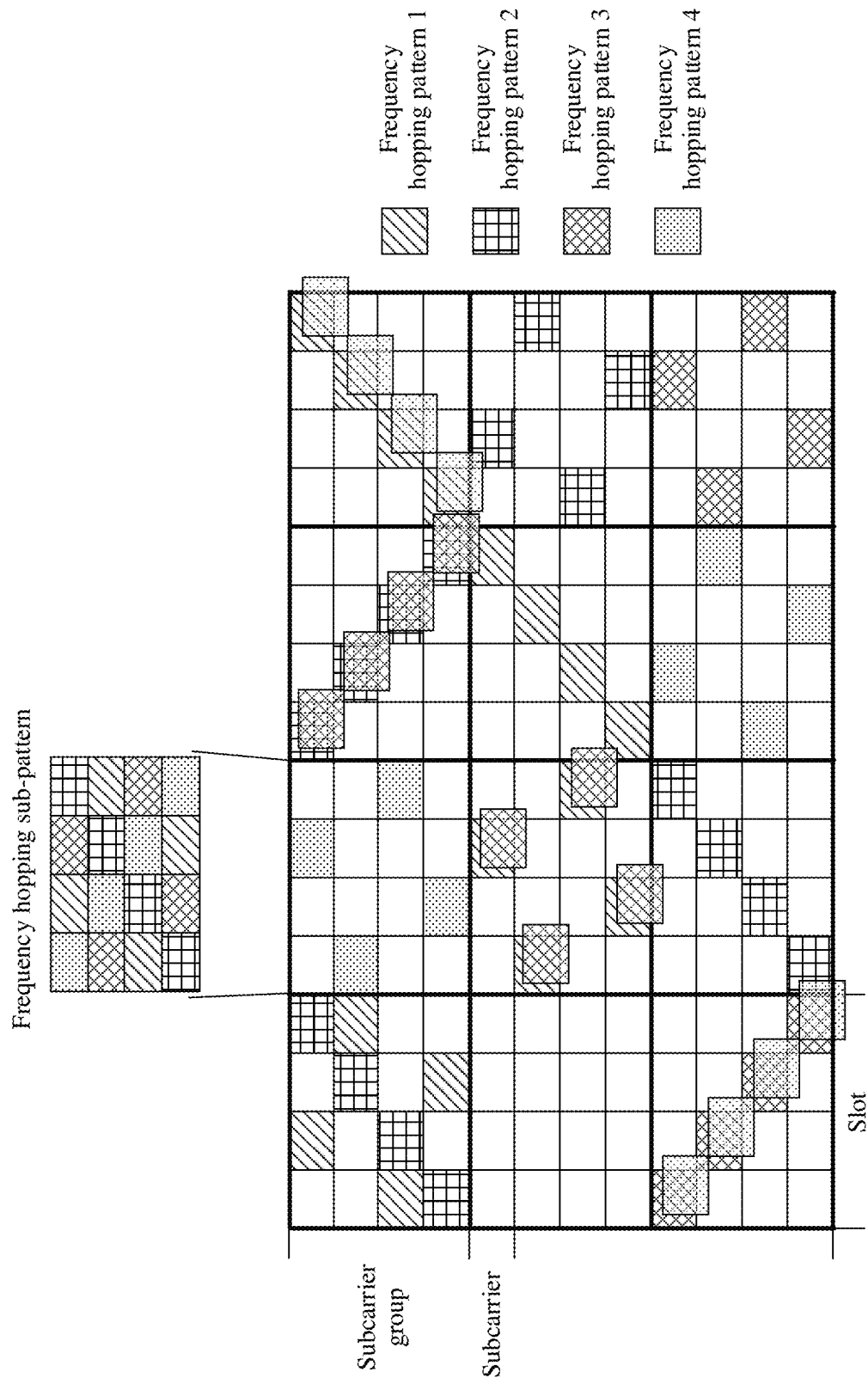
FIG. 7 is a schematic diagram of still another frequency hopping pattern according to an embodiment of this application.

FIG. 7 is a schematic diagram of four candidate frequency hopping patterns in the K candidate frequency hopping patterns according to another embodiment of this application. FIG. 7 shows subcarrier groups and candidate frequency hopping sub-patterns that are transmitted in four slots and that are determined based on the four candidate frequency hopping patterns. It should be noted that the candidate frequency hopping patterns in FIG. 6 are described by merely using an example in which a time domain resource unit is a slot, a frequency domain resource unit is a subcarrier group, a time domain resource sub-unit is an OFDM symbol, and a frequency domain resource sub-unit is a subcarrier. This does not limit the solution of this embodiment of this application. Not all candidate frequency hopping patterns are shown in FIG. 7, not all OFDM symbols are shown in one slot, and no complete candidate frequency hopping sub-pattern is shown. The four candidate frequency hopping patterns shown in FIG. 7 include a same frequency hopping unit, that is, overlap exists among the four candidate frequency hopping patterns. In FIG. 7, indexes of the subcarrier groups from the bottom to the top are from 0 to 2, and indexes of the slots from the left to the right are from 0 to 3. A frequency hopping pattern 1 and a frequency hopping pattern 3 include a same frequency hopping unit: the frequency hopping unit corresponding to a slot 1, a subcarrier group 1, and the shown frequency hopping sub-pattern. A frequency hopping pattern 2 and the frequency hopping pattern 3 include a same frequency hopping unit: the frequency hopping unit corresponding to a slot 2, a subcarrier group 2, and the shown frequency hopping sub-pattern. It can be learned from FIG. 7 that the frequency hopping pattern 1 and the frequency hopping pattern 2 do not include a same frequency hopping unit, subcarrier groups corresponding to the frequency hopping pattern 1 and the frequency hopping pattern 2 in a slot 0 are both a subcarrier group 2. Frequency hopping sub-patterns corresponding to the frequency hopping pattern 1 and the frequency hopping pattern 2 are different, and therefore, the frequency hopping pattern 1 and the frequency hopping pattern 2 do not overlap in the slot 0, that is, the frequency hopping pattern 1 and the frequency hopping pattern 2 do not include a same frequency hopping unit in the slot 0.

In this embodiment, partial overlap between smallest frequency hopping units in frequency hopping patterns is allowed, but overlap between subcarrier patterns is not allowed.

According to the solution of this embodiment of this application, the candidate frequency hopping patterns are allowed to include a same frequency hopping unit, that is, the candidate frequency hopping patterns partially overlap, thereby increasing a quantity of candidate frequency hopping patterns. In addition, the frequency hopping sub-pattern is introduced into a frequency domain resource unit and a time domain resource unit, that is, two-layer frequency hopping is introduced, increasing a dimension of the frequency hopping unit. This can further increase the quantity of candidate frequency hopping patterns, and reduce a probability of a conflict between terminal devices or network devices during signal transmission. For one candidate frequency hopping pattern, different frequency hopping sub-patterns are orthogonal. This increases a probability of correct detection to some extent, and improves detection performance of the network device or the terminal device. In addition, the foregoing manner of generating the candidate frequency hopping pattern can control an overlap degree of frequency hopping patterns, that is, control the design coefficient of the Bloom filter, so that the network device side or the terminal device side can detect the first data by using the compressive sensing algorithm, thereby improving detection accuracy.

Corresponding to the method provided in the foregoing method embodiments, embodiments of this application further provide a corresponding apparatus. The apparatus includes corresponding modules configured to perform the foregoing embodiments. The module may be software, hardware, or a combination of software and hardware.

Figure 8:
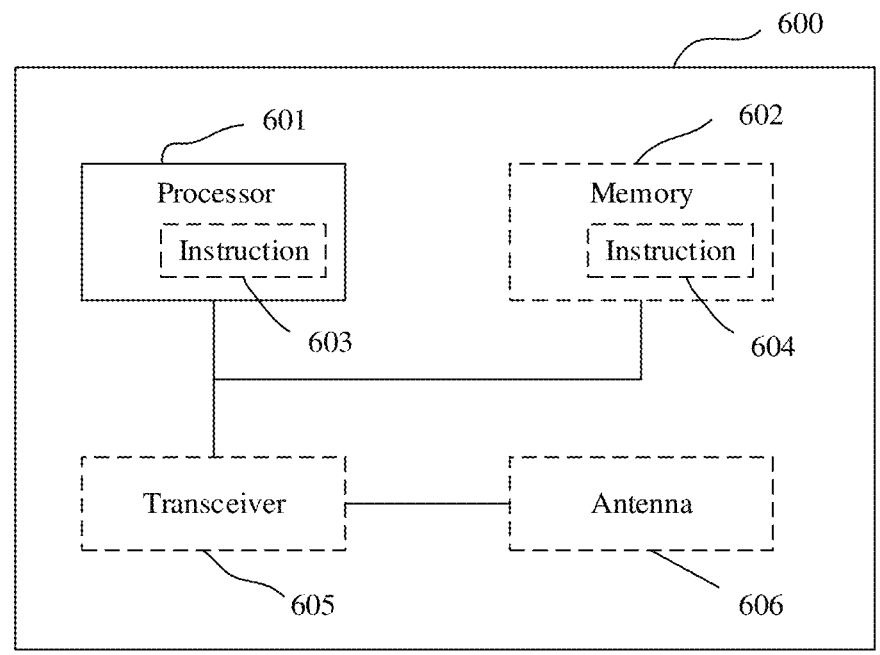
FIG. 8 is a schematic block diagram of a communication apparatus according to an embodiment of this application.

FIG. 8 is a schematic diagram of a structure of an apparatus 600. The apparatus 600 may be a network device; may be a terminal device; may be a chip, a chip system, a processor, or the like that supports a network device in implementing the foregoing method; or may be a chip, a chip system, a processor, or the like that supports a terminal device in implementing the foregoing method. The apparatus may be configured to implement the method described in the foregoing method embodiments. For details, refer to the descriptions in the foregoing method embodiments.

The apparatus 600 may include one or more processors 601. The processor 601 may also be referred to as a processing unit, and may implement a specific control function. The processor 601 may be a general-purpose processor, a dedicated processor, or the like. For example, the processor may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a software program, and process data of the software program.

In an optional design, the processor 601 may also store instructions and/or data 603. The instructions and/or data 603 may be run by the processor, to enable the apparatus 600 to perform the method described in the foregoing method embodiments.

In another optional design, the processor 601 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 600 may include a circuit. The circuit may implement the sending, receiving, or communication function in the foregoing method embodiments.

In some embodiments the apparatus 600 may include one or more memories 602. The memory stores instructions 604, and the instructions may be run on the processor, to enable the apparatus 600 to perform the method described in the foregoing method embodiments. In some embodiments the memory may further store data. In some embodiments the processor may also store instructions and/or data. The processor and the memory may be separately disposed, or may be integrated together. For example, the correspondence described in the foregoing method embodiments may be stored in the memory or stored in the processor.

In some embodiments the apparatus 600 may further include a transceiver 605 and/or an antenna 606. The processor 601 may be referred to as a processing unit, and controls the apparatus 600. The transceiver 605 may be referred to as a transceiver unit, a transceiver machine, a transceiver circuit, a transceiver apparatus, a transceiver module, or the like, and is configured to implement a transceiver function.

In some embodiments the apparatus 600 in this embodiment of this application may be configured to perform the method described in FIG. 4 in embodiments of this application, or may be configured to perform a method obtained by combining the plurality of forms described in the method 400.

The processor and the transceiver in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver each may be manufactured by using various IC processing technologies, for example, a complementary metal oxide semiconductor (CMOS), an n-type metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 8. The apparatus may be an independent device, or may be a part of a large device. For example, the apparatus may be:

(1) an independent integrated circuit IC, a chip, or a chip system or subsystem;
(2) a set with one or more ICs, where in some embodiments, the IC set may further include a storage component configured to store data and/or instructions;
(3) an ASIC, for example, a modem (MSM);
(4) a module that can be embedded in another device;
(5) a receiver machine, a terminal, an intelligent terminal, a cellular phone, a wireless device, a handheld device, a mobile unit, a vehicle-mounted device, a network device, a cloud device, an artificial intelligence device, a machine device, a home device, a medical device, or an industrial device;
(6) another device.

Figure 9:
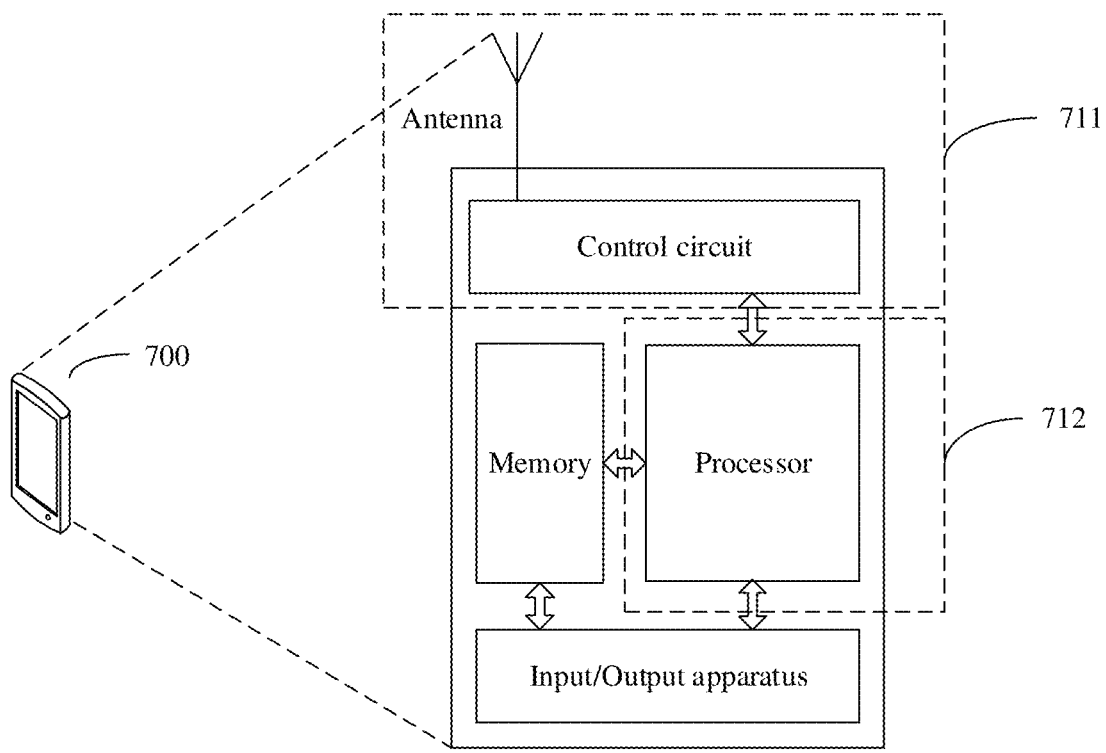
FIG. 9 is a schematic block diagram of a terminal device according to an embodiment of this application.

FIG. 9 is a schematic diagram of a structure of a terminal device. The terminal device is applicable to the scenario shown in FIG. 1. For ease of description, FIG. 9 shows only main components of the terminal device. As shown in FIG. 9, the terminal device 700 includes a processor, a memory, a control circuit, an antenna, and an input/output apparatus. The processor is mainly configured to process a communication protocol and communication data, control the entire terminal, execute a software program, and process data of the software program. The memory is mainly configured to store the software program and the data. The radio frequency circuit is mainly configured to perform conversion between a baseband signal and a radio frequency signal, and process a radio frequency signal. The antenna is mainly configured to receive and send a radio frequency signal in a form of an electromagnetic wave. The input/output apparatus, for example, a touchscreen, a display, or a keyboard, is mainly configured to: receive data entered by a user, and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 9 shows only one memory and one processor. An actual terminal device may include a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process a communication protocol and communication data. The central processing unit is mainly configured to control the entire terminal device, execute software program, and process data of the software program. Functions of the baseband processor and the central processing unit are integrated into the processor in FIG. 9. A person skilled in the art can understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in the storage unit in a form of the software program. The processor executes the software program to implement a baseband processing function.

In an example, the antenna and the control circuit that have receiving and sending functions may be considered as a transceiver unit 711 of the terminal device 700, and the processor having a processing function may be considered as a processing unit 712 of the terminal device 700. As shown in FIG. 9, the terminal device 700 includes the transceiver unit 711 and the processing unit 712. The transceiver unit may also be referred to as a transceiver, a transceiver machine, a transceiver apparatus, or the like. In some embodiments a device that is in the transceiver unit 711 and that is configured to implement a receiving function may be considered as a receiving unit, and a device that is in the transceiver unit 711 and that is configured to implement a sending function may be considered as a sending unit. In other words, the transceiver unit 711 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like. In some embodiments the receiving unit and the sending unit may be one integrated unit, or may be a plurality of independent units. The receiving unit and the sending unit may be in one geographical position, or may be distributed in a plurality of geographical positions.

Figure 10:
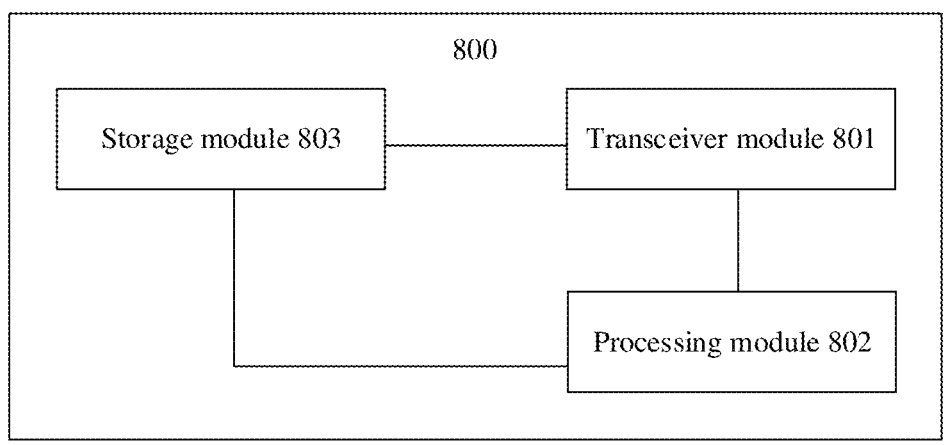
FIG. 10 is a schematic block diagram of a communication apparatus according to another embodiment of this application.

As shown in FIG. 10, another embodiment of this application provides an apparatus 800. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the method in the method embodiments of this application. The apparatus 800 may include a processing module 802 (or referred to as a processing unit). In some embodiments the apparatus 800 may further include a transceiver module 801 (or referred to as a transceiver unit) and a storage module 803 (or referred to as a storage unit).

In a possible design, one or more modules in FIG. 10 may be implemented by one or more processors, or may be implemented by one or more processors and memories, may be implemented by one or more processors and transceivers, or may be implemented by one or more processors, memories, and transceivers. This is not limited in embodiments of this application. The processor, the memory, and the transceiver may be disposed separately, or may be integrated.

The apparatus has a function of implementing the terminal described in embodiments of this application. For example, the apparatus includes a corresponding module, unit, or means (means) used for the terminal to perform the steps related to the terminal that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments. Alternatively, the apparatus has a function of implementing the network device described in embodiments of this application. For example, the apparatus includes a corresponding module, unit, or means (means) used for the network device to perform the steps related to the network device that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments.

In some embodiments each module in the apparatus 800 in this embodiment of this application may be configured to perform the method described in FIG. 4 in embodiments of this application, or may be configured to perform a method obtained by combining the plurality of forms described in the method 400.

In a possible design, the apparatus 800 may include the processing module 802 and the transceiver module 801.

The processing module 802 is configured to map first data based on a first frequency hopping pattern, where the first frequency hopping pattern is one of K candidate frequency hopping patterns, one candidate frequency hopping pattern in the K candidate frequency hopping patterns includes L frequency hopping units, at least two candidate frequency hopping patterns in the K candidate frequency hopping patterns include a same frequency hopping unit, K is an integer greater than 1, and L is an integer greater than 1. The transceiver module is configured to send the first data to a network device or a terminal device.

In some embodiments one of the L frequency hopping units includes one frequency domain resource unit in frequency domain and includes one time domain resource unit in time domain.

In some embodiments an index of the frequency domain resource unit is related to L.

In some embodiments the index of the frequency domain resource unit meets:

$$\Sigma_{l=0}^{L-1}((m_{k,l}-l) \bmod M) \times M^l = (\Sigma_{i=0}^{p} c((k+1) \times \theta + i) \times 2^i) \bmod M^L$$

where $m_{k,l}$ is the index of the frequency domain resource unit, $m_{k,l}$ is an integer less than or equal to M−1, M represents a quantity of candidate frequency domain resource units included in the frequency domain resource used to map the first data, the frequency domain resource unit is one of the candidate frequency domain resource units, k represents an index of the candidate frequency hopping pattern, k is an integer less than or equal to K−1, l represents an index of the time domain resource unit, l is an integer less than or equal to L−1, c(n) represents a Gold sequence, p represents a parameter related to a length of the Gold sequence, and θ represents a related parameter.

In some embodiments one of the L frequency hopping units includes one code domain resource unit in code domain, the code domain resource unit is one of V candidate code domain resource units, and V is an integer greater than 1.

In some embodiments the index of the frequency domain resource unit is related to L and V, and an index of the code domain resource unit is related to L and V.

In some embodiments the index of the frequency domain resource unit and the index of the code domain resource unit meet:

$$\Sigma_{l=0}^{L-1}(12 \times v_{k,l} + m_{k,l} - l) \bmod (M \times V)) \times (M \times V)^l = (\Sigma_{i=0}^{p} c((k+1) \times \theta + i) \times 2^i) \bmod (M \times V)^L$$

where $m_{k,l}$ is the index of the frequency domain resource unit, $m_{k,l}$ is an integer less than or equal to M−1, M represents the quantity of candidate frequency domain resource units included in the frequency domain resource used to map the first data, the frequency domain resource unit is one of the candidate frequency domain resource units, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, l is an integer less than or equal to L−1, c(n) represents the Gold sequence, p represents the parameter related to the length of the Gold sequence, and θ represents the related parameter.

In some embodiments the code domain resource unit is related to the index of the code domain resource unit and a quantity N of symbols of the time domain resource unit, and N is a positive integer.

In some embodiments the code domain resource unit is a sequence $x_{v_{k,l}}(n)$, and the sequence $x_{v_{k,l}}(n)$ meets:

$$x_{v_{k,l}}(n) = \exp(j \times \pi \times (\varphi(n)/4) + 3 \times v_{k,l} \times n/7)$$

where n is an index of the symbol in the time domain resource unit, n is an integer less than or equal to N−1, j is an imaginary unit, φ(n) is a preset sequence, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, and l is an integer less than or equal to L−1.

In another possible design, the apparatus 800 may include the processing module 802 and the transceiver module 801.

The transceiver module 801 is configured to receive first data from a network device or a terminal device. The processing module 802 is configured to demap the first data based on a first frequency hopping pattern, where the first frequency hopping pattern is one of K candidate frequency hopping patterns, one candidate frequency hopping pattern in the K candidate frequency hopping patterns includes L frequency hopping units, at least two candidate frequency hopping patterns in the K candidate frequency hopping patterns include a same frequency hopping unit, K is an integer greater than 1, and L is an integer greater than 1.

In some embodiments one of the L frequency hopping units includes one frequency domain resource unit in frequency domain and includes one time domain resource unit in time domain.

In some embodiments an index of the frequency domain resource unit is related to L.

In some embodiments the index of the frequency domain resource unit meets:

$$\Sigma_{l=0}^{L-1}((m_{k,l}-l) \bmod M) \times M^l = (\Sigma_{i=0}^{p} c((k+1) \times \theta + i) \times 2^i) \bmod M^L$$

where $m_{k,l}$ is the index of the frequency domain resource unit, $m_{k,l}$ is an integer less than or equal to M−1, M represents a quantity of candidate frequency domain resource units included in the frequency domain resource used to map the first data, the frequency domain resource unit is one of the candidate frequency domain resource units, k represents an index of the candidate frequency hopping pattern, k is an integer less than or equal to K−1, l represents an index of the time domain resource unit, l is an integer less than or equal to L−1, c(n) represents a Gold sequence, p represents a parameter related to a length of the Gold sequence, and θ represents a related parameter.

In some embodiments one of the L frequency hopping units includes one code domain resource unit in code domain, the code domain resource unit is one of V candidate code domain resource units, and V is an integer greater than 1.

In some embodiments the index of the frequency domain resource unit is related to L and V, and an index of the code domain resource unit is related to L and V.

In some embodiments the index of the frequency domain resource unit and the index of the code domain resource unit meet:

$$\Sigma_{l=0}^{L-1}(12 \times v_{k,l} + m_{k,l} - l) \bmod (M \times V)) \times (M \times V)^l = (\Sigma_{i=0}^{p} c((k+1) \times \theta + i) \times 2^i) \bmod (M \times V)^L$$

where $m_{k,l}$ is the index of the frequency domain resource unit, $m_{k,l}$ is an integer less than or equal to M−1, M represents a quantity of candidate frequency domain resource units included in the frequency domain resource used to map the first data, the frequency domain resource unit is one of the candidate frequency domain resource units, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, l is an integer less than or equal to L−1, c(n) represents the Gold sequence, p represents the parameter related to the length of the Gold sequence, and θ represents the related parameter.

In some embodiments the code domain resource unit is related to the index of the code domain resource unit and a quantity N of symbols of the time domain resource unit, and N is a positive integer.

In some embodiments the code domain resource unit is a sequence $x_{v_{k,l}}(n)$, and the sequence $x_{v_{k,l}}(n)$ meets:

$$x_{v_{k,l}}(n)=\exp(j\times\pi\times(\varphi(n)/4)+3\times v_{k,l}\times n/7)$$

where n is an index of the symbol in the time domain resource unit, n is an integer less than or equal to N−1, j is an imaginary unit, $\varphi(n)$ is a preset sequence, $v_{k,l}$ is the index of the code domain resource unit, $v_{k,l}$ is an integer less than or equal to V−1, k represents the index of the candidate frequency hopping pattern, k is an integer less than or equal to K−1, l represents the index of the time domain resource unit, and l is an integer less than or equal to L−1.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the functions for corresponding applications, but it should not be considered that the implementation goes beyond the protection scope of embodiments of this application.

It may be understood that, the processor in embodiments of this application may be an integrated circuit chip, and has a signal processing capability. In an implementation process, steps in the foregoing method embodiment may be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. In some embodiments the general-purpose processor may alternatively be any processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a transitory memory or a non-transitory memory, or may include both the transitory memory and the non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM) and is used as an external high-speed cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented through software, hardware, firmware, or any combination thereof. When software is used to implement embodiments, all or some of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. Moreover, the particular features, structures, or characteristics may be combined in one or more embodiments in any proper manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a position in this application are merely used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural. The character "/" generally represents an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C exist. A may be singular or plural, B may be singular or plural, and C may be singular or plural.

It may be understood that in embodiments of this application, "B corresponding to A" indicates that B is associated with A, and B may be determined based on A. However, it should be further understood that determining B based on A does not mean that B is determined based only on A. That is, B may also be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

A person of ordinary skill in the art may understand that, for a purpose of convenient and brief descriptions, for a detailed working process of the foregoing system, apparatus, and units, refer to a corresponding process in the foregoing method embodiments. Details are not described herein again.

It may be understood that the system, apparatus, and method described in this application may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in the embodiments, unless otherwise specified or a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A communication method, comprising:
receiving first data from a network device or a terminal device; and
demapping the first data based on a first frequency hopping pattern, wherein the first frequency hopping pattern is one of K candidate frequency hopping patterns, one candidate frequency hopping pattern in the K candidate frequency hopping patterns comprises L frequency hopping portions, at least two candidate frequency hopping patterns in the K candidate frequency hopping patterns comprise a same frequency hopping portion, K is an integer greater than 1, and L is an integer greater than 1;
wherein one of the L frequency hopping portions comprises one frequency domain resource portion in a frequency domain and comprises one time domain resource portion in a time domain;
the index of the frequency domain resource portion satisfies at least:

$$\Sigma_{l=0}^{L-1}((m_{k,l}-l)\bmod M)\times M^l = (\Sigma_{i=0}^{p} c((k+1)\times\theta+i)\times 2^i) \bmod M^L$$

wherein $m_{k,l}$ is an index of the frequency domain resource portion, $m_{k,l}$ is an integer less than or equal to M−1, M represents a quantity of candidate frequency domain resource portions comprised in the frequency domain resource useable to map the first data, the frequency domain resource portion is one of the candidate frequency domain resource portions, k represents an index of the candidate frequency hopping pattern, k is an integer less than or equal to K−1, l represents an index of the time domain resource portion, l is an integer less than or equal to L−1, c(n) represents a Gold sequence, p represents a parameter related to a length of the Gold sequence, and θ represents a related parameter.

2. The method according to claim 1, wherein the index of the frequency domain resource portion is related to L.

3. The method according to claim 1, wherein one of the L frequency hopping portions comprises one code domain resource portion in a code domain, the code domain resource portion is one of V candidate code domain resource portions, and V is an integer greater than 1.

4. The method according to claim 3, wherein an index of the frequency domain resource portion is related to L and V, and an index of the code domain resource portion is related to L and V.

5. The method according to claim 4, wherein the index of the frequency domain resource portion and the index of the code domain resource portion satisfy at least:

$$\Sigma_{l=0}^{L}(12\times v_{k,l}+m_{k}-l)\bmod(M\times V))\times(M\times V)^l = (\Sigma_{i=0}^{p} c((k+1)\times\theta+i)\times 2^i)\bmod(M\times V)^L$$

$m_{k,l}$ is the index of the frequency domain resource portion, $m_{k,l}$ is an integer less than or equal to M−1, M represents the quantity of candidate frequency domain resource portions comprised in the frequency domain resource useable to map the first data, the frequency domain resource portion is one of the candidate frequency domain resource portions, $v_{k,l}$ is the index of the code domain resource portion, $v_{k,l}$ is an integer less than or equal to V−1, k represents an index of the candidate frequency hopping pattern, k is an integer less than or equal to K−1, l represents an index of the time domain resource portion, l is an integer less than or equal to L−1, c(n) represents a Gold sequence, p represents a parameter related to a length of the Gold sequence, and θ represents a related parameter.

6. An apparatus, comprising:
one or more processors; and
a memory coupled to the one or more processors, wherein the memory is configured to store non-transitory instructions, and in response to being executed by the one or more processors, cause the apparatus to execute operations comprising:
receiving first data from a network device or a terminal device; and
demapping the first data based on a first frequency hopping pattern, wherein the first frequency hopping pattern is one of K candidate frequency hopping patterns, one candidate frequency hopping pattern in the K candidate frequency hopping patterns comprises L frequency hopping portions, at least two candidate frequency hopping patterns in the K candidate frequency hopping patterns comprise a same frequency hopping portion, K is an integer greater than 1, and L is an integer greater than 1;
wherein one of the L frequency hopping portions comprises one frequency domain resource portion in a frequency domain and comprises one time domain resource portion in a time domain;
wherein an index of the frequency domain resource portion satisfies at least:

$$\Sigma_{l=0}^{L-1}((m_{k,l}-l)\bmod M)\times M^l = (\Sigma_{i=0}^{p} c((k+1)\times\theta+i)\times 2^i) \bmod M^L$$

wherein $m_{k,l}$ is the index of the frequency domain resource portion, $m_{k,l}$ is an integer less than or equal to M−1, M represents a quantity of candidate frequency domain resource portions comprised in the frequency domain resource useable to map the first data, the frequency domain resource portion is one of the candidate frequency domain resource portions, k represents an index of the candidate frequency hopping pattern, k is an integer less than or equal to K−1, l represents an index of the time domain resource portion, l is an integer less than or equal to L−1, c(n) represents a Gold sequence, p represents a parameter related to a length of the Gold sequence, and θ represents a related parameter.

7. The apparatus according to claim 6, wherein the index of the frequency domain resource portion is related to L.

8. The apparatus according to claim 6, wherein one of the L frequency hopping portions comprises one code domain resource portion in a code domain, the code domain resource portion is one of V candidate code domain resource portions, and V is an integer greater than 1.

9. The apparatus according to claim 8, wherein the index of the frequency domain resource portion is related to L and V, and an index of the code domain resource portion is related to L and V.

10. The apparatus according to claim 9, wherein the index of the frequency domain resource portion and the index of the code domain resource portion satisfy at least:

$$\Sigma_{l=0}^{L}(12 \times v_{k,l}+m_{k,l}-l) \bmod (M \times V)) \times (M \times V)^l = (\Sigma_{i=0}^{p} c((k+1) \times \theta + i) \times 2^i) \bmod (M \times V)^L$$

wherein $m_{k,l}$ is the index of the frequency domain resource portion, $m_{k,l}$ is an integer less than or equal to M−1, M represents the quantity of candidate frequency domain resource portions comprised in the frequency domain resource useable to map the first data, the frequency domain resource portion is one of the candidate frequency domain resource portions, $v_{k,l}$ is the index of the code domain resource portion, and $v_{k,l}$ is an integer less than or equal to V−1, k represents an index of the candidate frequency hopping pattern, k is an integer less than or equal to K−1, l represents an index of the time domain resource portion, l is an integer less than or equal to L−1, c(n) represents a Gold sequence, p represents a parameter related to a length of the Gold sequence, and θ represents a a related parameter.

11. A non-transitory computer readable medium storing non-transitory instructions, and in response to the non-transitory instructions being executed by one or more processors, the one or more processors are configured: to perform operations comprising:

receiving first data from a network device or a terminal device; and demapping the first data based on a first frequency hopping pattern, wherein the first frequency hopping pattern is one of K candidate frequency hopping patterns, one candidate frequency hopping pattern in the K candidate frequency hopping patterns comprises L frequency hopping portions, at least two candidate frequency hopping patterns in the K candidate frequency hopping patterns comprise a same frequency hopping portion, K is an integer greater than 1, and L is an integer greater than 1;

wherein one of the L frequency hopping portions comprises one frequency domain resource portion in a frequency domain and comprises one time domain resource portion in a time domain;

wherein the index of the frequency domain resource portion satisfies at least:

$$\Sigma_{l=0}^{L-1}((m_{k,l}-l) \bmod M) \times M^l = (\Sigma_{i=0}^{p} c((k+1) \times \theta + i) \times 2^i) \bmod M^L$$

wherein $m_{k,l}$ is an index of the frequency domain resource portion, $m_{k,l}$ is an integer less than or equal to M−1, M represents a quantity of candidate frequency domain resource portions comprised in the frequency domain resource useable to map the first data, the frequency domain resource portion is one of the candidate frequency domain resource portions, k represents an index of the candidate frequency hopping pattern, k is an integer less than or equal to K−1, l represents an index of the time domain resource portion, l is an integer less than or equal to L−1, c(n) represents a Gold sequence, p represents a parameter related to a length of the Gold sequence, and θ represents a related parameter.

12. The non-transitory computer readable medium according to claim 11, wherein the index of the frequency domain resource portion is related to L.

13. The non-transitory computer readable medium according to claim 11, wherein one of the L frequency hopping portions comprises one code domain resource portion in a code domain, the code domain resource portion is one of V candidate code domain resource portions, and V is an integer greater than 1.

14. The non-transitory computer readable medium according to claim 13, wherein an index of the frequency domain resource portion is related to L and V, and an index of the code domain resource portion is related to L and V.

* * * * *